United States Patent [19]

Kobayashi et al.

[11] Patent Number: 4,627,688

[45] Date of Patent: Dec. 9, 1986

[54] BEAM SPLITTER

[75] Inventors: Takeshi Kobayashi; Kazuo Endo; Nobumasa Nanbu; Yoshizi Kawamura, all of Sano, Japan

[73] Assignee: Sano Kiko Co., Ltd., Japan

[21] Appl. No.: 800,095

[22] Filed: Nov. 20, 1985

Related U.S. Application Data

[63] Continuation of Ser. No. 510,287, Jul. 1, 1983, abandoned.

[51] Int. Cl.[4] .............................................. G02B 27/14
[52] U.S. Cl. ..................................... 350/173; 350/166
[58] Field of Search ....................... 350/173, 166, 286

[56] References Cited

U.S. PATENT DOCUMENTS 4,415,233 11/1983 Itoh et al. ............................ 350/173
4,431,258 2/1984 Fye ..................................... 350/173

Primary Examiner—John K. Corbin
Assistant Examiner—Paul M. Dzierzynski
Attorney, Agent, or Firm—Curtis, Morris & Safford

[57] ABSTRACT

A beam splitter comprises a transparent substrate having a refractive index $N_S$, at least one low refractive index film layer having a refractive index $N_L$ higher than $N_S$, and at least one high refractive index film layer having a refractive index $N_H$ higher than $N_L$. The low refractive index film layer and the high refractive index film layer are alternately stacked on the substrate so that the lowermost film layer and the uppermost film layer of the stack are the low refractive index film layer, or the lowermost film layer is the high refractive index film layer and the uppermost film layer is the low refractive index film layer.

13 Claims, 27 Drawing Figures

FIG. 14
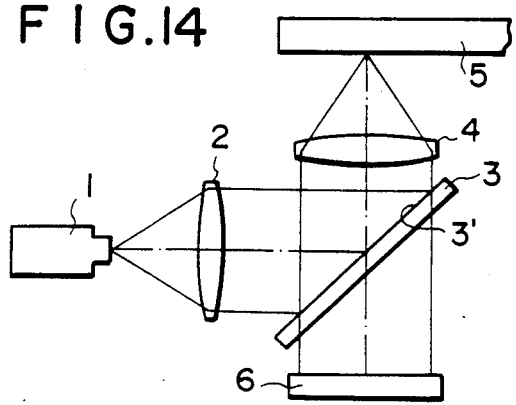
FIG. 15
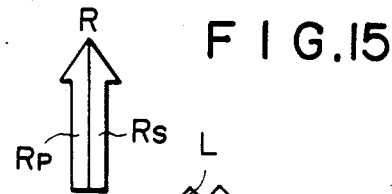
FIG. 16
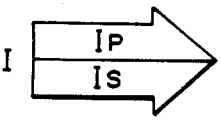
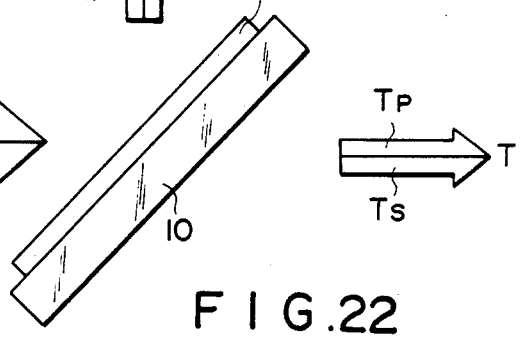
FIG. 22
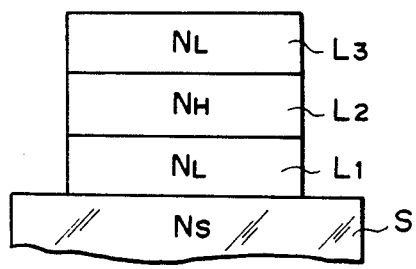
FIG. 17
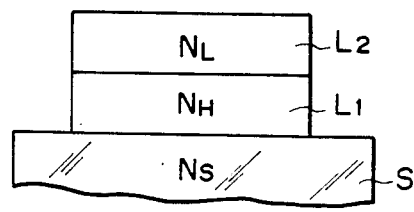
FIG. 23
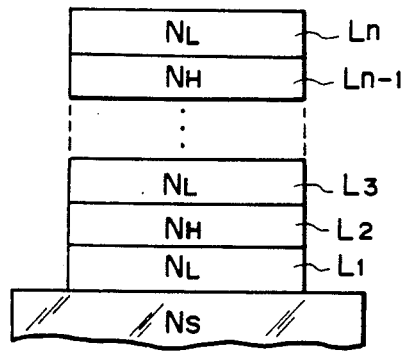
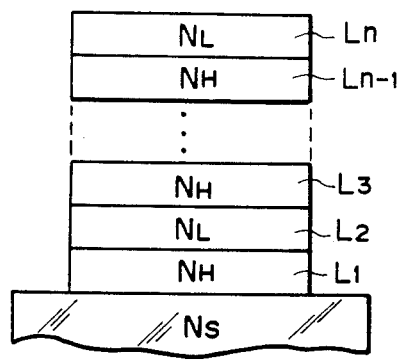

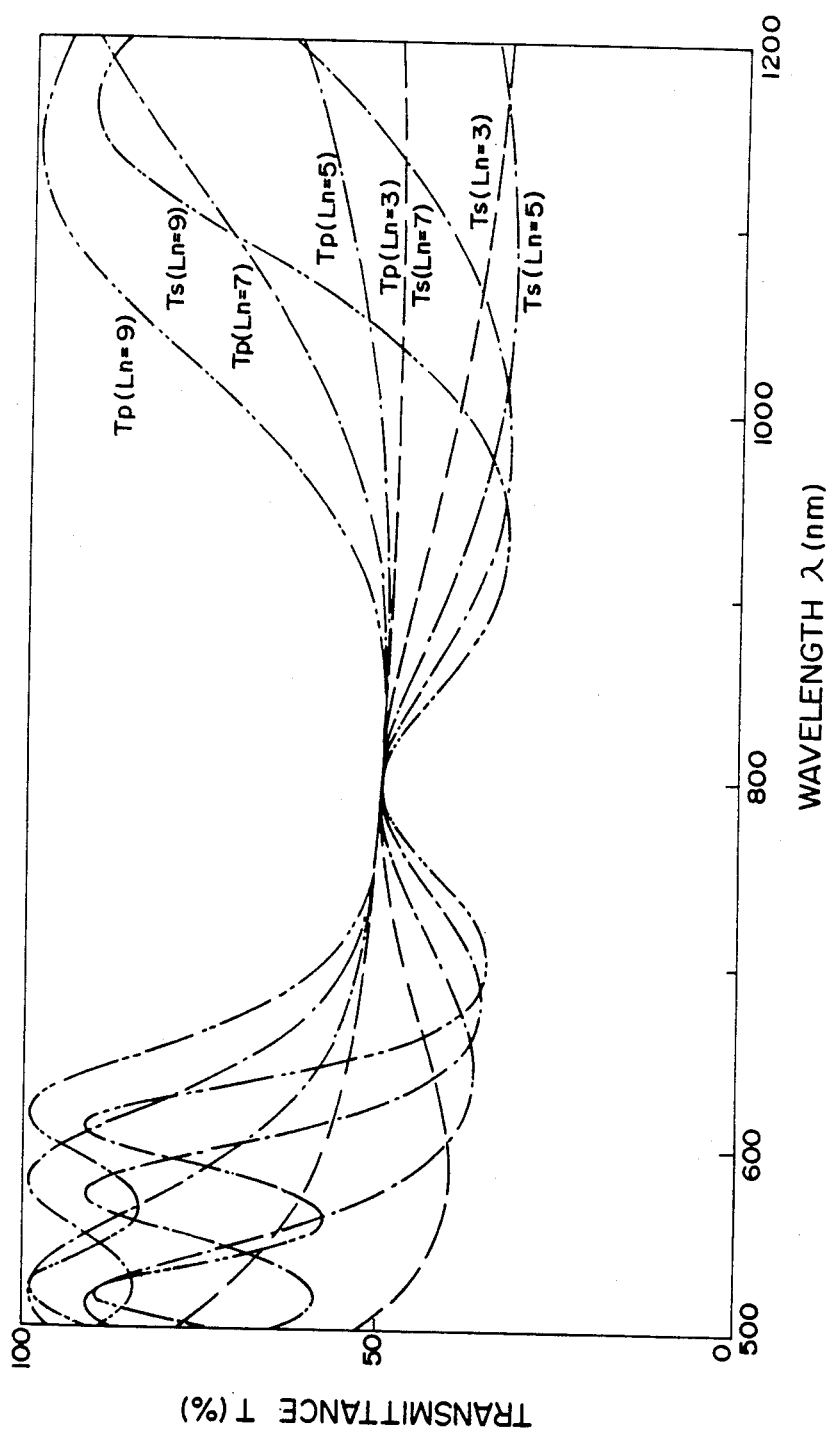

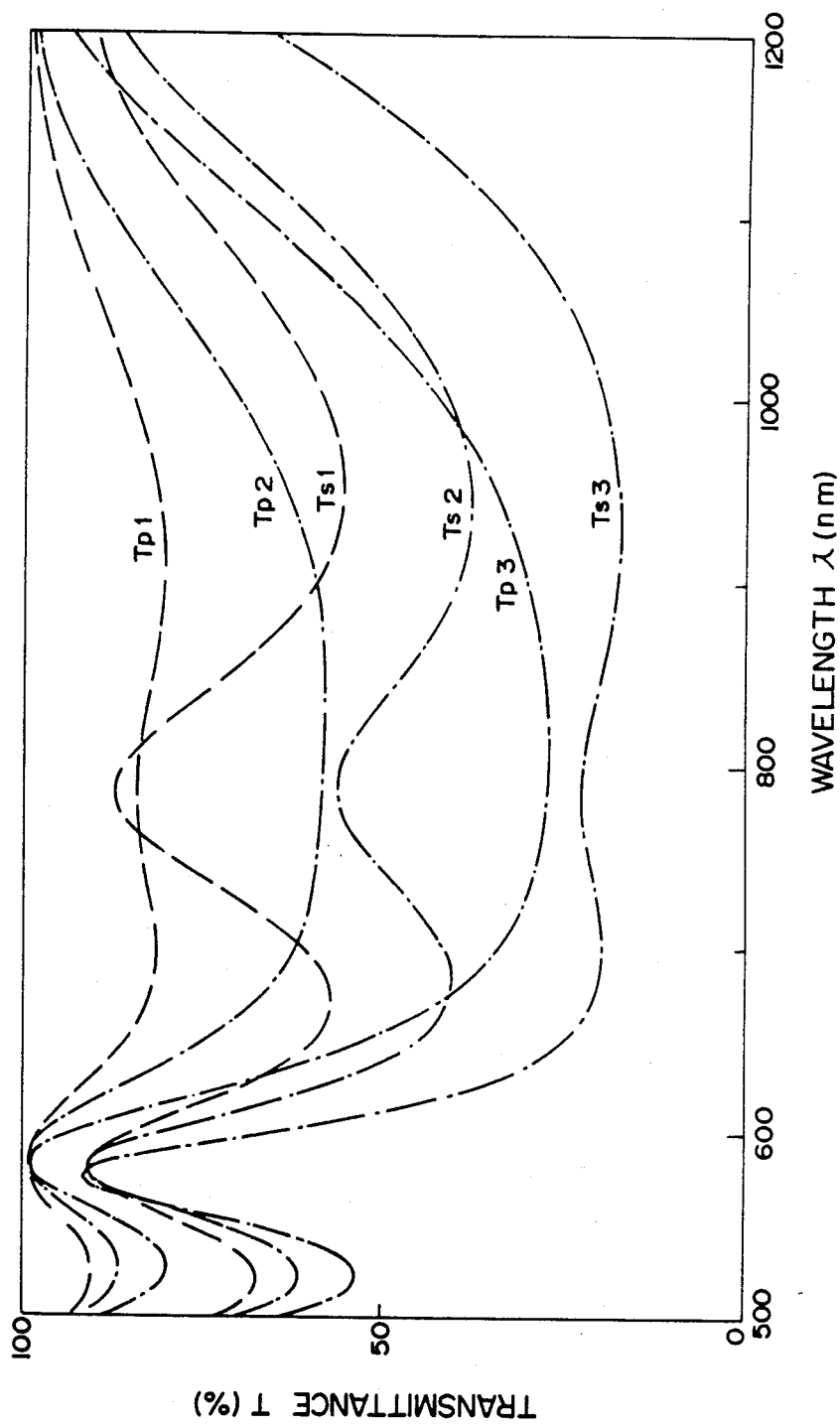

BEAM SPLITTER

This application is a continuation of application Ser. No. 510,287 now abandoned, filed July 1, 1983.

BACKGROUND OF THE INVENTION

1. Field of the Invention

This invention relates to a beam splitter, and more particularly to a beam splitter comprising a multilayer interference film wherein the ratio of polarized light components to each other in the reflected light and the transmitted light can be made equal to the ratio of polarized light components contained in the incident light to each other, and can also be adjusted as desired.

2. Description of the Prior Art

In general, when unpolarized light obliquely impinges upon an interface of two different media, the component ratio of the P polarized light (i.e. the polarized light vibrating in parallel with the incident face) to the S polarized light (i.e. the polarized light vibrating perpendicularly to the incident face) which are contained in the light reflected from the interface becomes different from the component ratio of the P polarized light to the S polarized light which are contained in the light passing through the interface. The component ratio depends on the angle of incidence and the refractive indices of the two media. Normally, however, the reflected light contains the S polarized light in a proportion higher than the P polarized light, and the transmitted light contains the P polarized light in a proportion higher than the S polarized light. It is known that, in the Brewster angle condition at the interface of the two media, the S polarized light component and the P polarized light component can be approximately isolated from each other as the reflected light and the transmitted light, respectively. A polarizing prism utilizing such a phenomenon has been proposed, for example, in Japanese Patent Publication No. 55(1980)-9683, and has been put into practice in the MCA type photo-disk reproducing optical system of Philips, or the like. However, the polarizing prism used in the photo-disk reproducing optical system is not of the type essential as a basic element for reproducing the signals, but is used to stabilize the output of the laser generator serving as a light source for reproduction. Namely, in the conventional laser generator used for reproducing with the photo-disk, when reverse incidence of signal light called "back talk" occurs, the output light generated by the laser generator fluctuates depending on the phase of the back talk, and adversely affects the signal reproducing. To prevent the back talk, the aforesaid polarizing prism is used in combination with a quarter-wave plate in the conventional photo-disk reproducing optical system. (The functions of the polarizing prism and the quarter-wave plate, and details of the reproducing optical system are well known and not explained herein in further detail.)

More recently, various improved laser generators, for example, laser generators unaffected by the aforesaid back talk, have been proposed. It has also been proposed to detect signals by utilizing the reverse incidence itself by use of the self-coupling effect as in the case of a certain kind of semiconductor laser beam. Under these circumstances, the polarizing prism and the quarter-wave plate used in the conventional photo-disk reproducing optical system becomes unnecessary, and the construction of the reproducing optical system can be markedly simplified.

FIGS. 1 and 14 show examples of the photo-disk reproducing optical system having a construction simplified as described above. In each of FIGS. 1 and 14, a laser generator 1 is of the type unaffected by the back talk. Light emitted from the laser generator 1 is collimated into a parallel light beam by a collimator lens 2, and is then made to impinge upon a beam splitter 3. The beam splitter 3 is provided with a semi-transparent mirror 3' which may, for example, be of the 50% transmitting and 50% reflecting type. The light beam reflected from the semi-transparent mirror 3' is converged on the signal section of a photo-disk 5 by an objective lens 4, thereby to irradiate spot-wise the signal section provided with pits. The light reflected from the signal section is phase-modulated according to the shape and dimensions of the pit, and involves a change in intensity due to light interference. The phase-modulated light again impinges on the objective lens 4 as signal light. The signal light collimated into a parallel light beam by the objective lens 4 again reaches the semi-transparent mirror 3', and the light beam passing through the semi-transparent mirror 3' is detected by a photo-sensor 6. In the system described above, the light emitted from the laser generator 1 is once reflected from the semi-transparent mirror 3' and then transmitted therethrough. Therefore, when the transmittance (or the reflectance) of the semi-transparent mirror 3' is 50%, the amount of light reaching the photo-sensor 6 reduces to 25%. The light use efficiency obtainable in this case is the highest in the system described above.

In the optical system described above, the semi-transparent mirror 3' is used not only as the reflecting face but also as the transmitting face. Therefore, when a semi-transparent mirror of the type generally used is positioned in the optical system, the light use efficiency is further decreased for the reason as described below. Namely, as mentioned above, the reflecting and transmitting characteristics of an ordinary semi-transparent mirror differ between the P polarized light and the S polarized light. Accordingly, when the semi-transparent mirror first serves as the reflecting face, a major proportion of the P polarized light is transmitted therethrough, and the light mainly containing the S polarized light is reflected toward the photo-disk 5. (When the reflectance of the semi-transparent mirror is 50%, the total amount of the P polarized light and the S polarized light reflected is 50%.) Thereafter, when the signal light mainly containing the S polarized light and reflected from the photo-disk 5 again impinges upon the semi-transparent mirror 3', most of the signal light is again reflected from the semi-transparent mirror 3' because of the characteristics of the ordinary semi-transparent mirror. As a result, the light reaching the photo-sensor 6 becomes very weak, requiring a photo-sensor having a high capacity. To solve this problem, there is needed a semi-transparent mirror exhibiting the characteristics of approximately equally reflecting (or transmitting) the P polarized light component and the S polarized light component.

Further, in a photometric optical system of a camera, or the like, luminance detection is conducted via a semi-transparent mirror. In such an optical system, one portion of light split by the semi-transparent mirror is used for viewing through the view finder, and the other portion of light is used for photometry. In this case, most of the light impinging upon the semi-transparent mirror is the light reflected from the object region. Accordingly, the incident light is apt to contain mainly the S polarized light component. Particularly, when there is a reflective surface such as water surface or window glass surface in the object region, the incident light contains very much S polarized light component, depending on the angle of incidence. However, since an ordinary semi-transparent mirror reflects mainly the S polarized light, the amounts of light portions split by the semi-transparent mirror become unbalanced even when the transmittance of the semi-transparent mirror is 50%. Therefore, it is not always possible to correctly conduct the photometry. Also to solve this problem, a need exists for a semi-transparent mirror exhibiting equal reflecting and transmitting characteristics both for the P polarized light component and the S polarized light component.

SUMMARY OF THE INVENTION

The primary object of the present invention is to provide a beam splitter exhibiting equal reflecting and transmitting characteristics both for the P polarized light component and the S polarized light component.

Another object of the present invention is to provide a beam splitter wherein the reflecting and transmitting characteristics for the P polarized light component and the S polarized light component can be adjusted as desired.

The specific object of the present invention is to provide a beam splitter exhibiting the improved characteristics and still capable of being produced easily.

The beam splitter in accordance with the present invention consists essentially of a transparent substrate having a refractive index $N_S$, at least one low refractive index film layer having a refractive index $N_L$ higher than said refractive index $N_S$, and at least one high refractive index film layer having a refractive index $N_H$ higher than said refractive index $N_L$, said low refractive index film layer and said high refractive index film layer being alternately stacked on said transparent substrate in such a manner that the uppermost film layer of the stack is the low refractive index film layer. Each film layer of the stack on the transparent substrate may be constituted by an equivalent layer consisting of a number of sub-layers of lower refractive index.

In the present invention, the transmitting and reflecting characteristics of the beam splitter for splitting the incident light into the transmitted light and the reflected light can be made equal both for the P polarized light component and the S polarized light component. Further, the ratio of the P and S polarized light components to each other in the transmitted light and the reflected light can be adjusted as desired. This is very advantageous in the practical use, and the beam splitter in accordance with the present invention is suitable for a variety of purposes. Further, the beam splitter can be easily massproduced by using the conventional deposition equipment and materials.

BRIEF DESCRIPTION OF THE DRAWINGS

FIG. 14 is a schematic view showing an example of the photo-disk reproducing optical system wherein an embodiment of the beam splitter in accordance with the present invention which is of the plate type and comprises an odd number of film layers is used, FIG. 15 is an explanatory view showing the characteristics of an embodiment of the beam splitter in accordance with the present invention which is of the plate type, FIG. 16 is a schematic view showing an embodiment of the beam splitter in accordance with the present invention which is of the plate type and comprises three film layers, FIG. 17 is a schematic view showing an embodiment of the beam splitter in accordance with the present invention which is of the plate type and comprises "n" film layers wherein "n" is an odd number, FIG. 18 is a graph showing the spectral transmission characteristics of an embodiment of the beam splitter in accordance with the present invention which is of the plate type and comprises an odd number of film layers wherein the transmittance is equal both for the P and S polarized light components, FIG. 22 is a schematic view showing an embodiment of the beam splitter in accordance with the present invention which is of the plate type and comprises two film layers, FIG. 23 is a schematic view showing an embodiment of the beam splitter in accordance with the present invention which is of the plate type and comprises "n" film layers wherein "n" is an even number, FIG. 27 is a graph showing the spectral transmission characteristics of an embodiment of the beam splitter in accordance with the present invention which is of the plate type and comprises an even number of film layers, wherein the transmittance $T_P$ for the P polarized light component is lower than the transmittance $T_S$ for the S polarized light component, and the ratios $T_P:T_S$ and $(T_P+T_S):(R_P+R_S)$ can take arbitrary values.

DESCRIPTION OF THE PREFERRED EMBODIMENTS

The present invention will hereinbelow be described in further detail with reference to the accompanying drawings.

Figure 1:
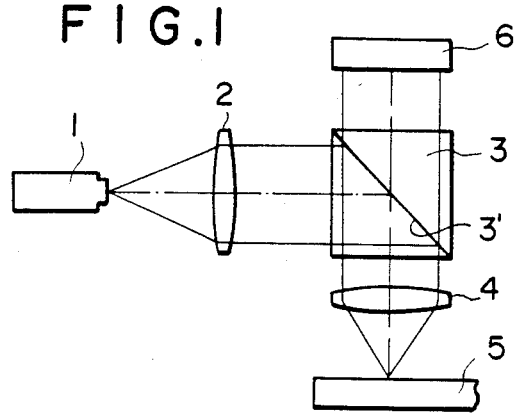
FIG. 1 is a schematic view showing an example of the photo-disk reproducing optical system wherein an embodiment of the beam splitter in accordance with the present invention which is of the prism type is used.
Figure 2:
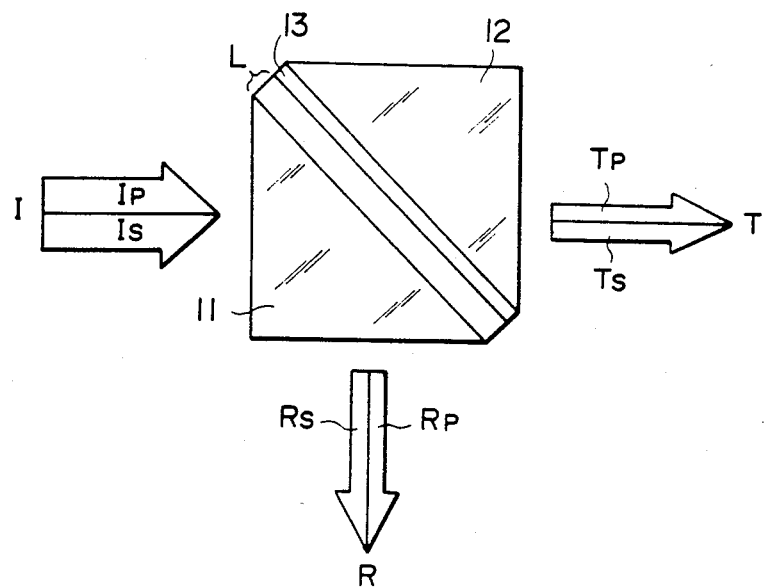
FIG. 2 is an explanatory view showing the characteristics of an embodiment of the beam splitter in accordance with the present invention which is of the prism type.

Referring to FIG. 2 showing an embodiment of the beam splitter in accordance with the present invention which is of the prism type, a multilayer interference film L is coated on a prism block 11 by deposition, and a prism block 12 is adhered to the multilayer interference film L by an adhesive 13. When the characteristics of the beam splitter formed as shown in FIG. 2 are adjusted so that the reflectance and the transmittance are respectively 50% both for the P and S polarized light component, incident light I entering the beam splitter from the left side of FIG. 2 is split into transmitted light T and reflected light R. When the incident light I contains the P polarized light component $I_P$ and the S polarized component $I_S$ respectively in a proportion of 50%, with the total light amount being 100, the amount of the transmitted light T is 50 ($T_P:T_S=25:25$), and the amount of the reflected light R is also 50 ($R_P:R_S=25:25$). Thus, the ratio of the P and S polarized light components to each other in the transmitted light T and the reflected light R is equal to the ratio of the P and S polarized light components, which are contained in the incident light I, to each other. Whichever the polarized light component ratio $I_P/I_S$ is in the incident light I, the component ratio does not change in the transmitted light and the reflected light. This is merely an example of the characteristics obtainable with the beam splitter in accordance with the present invention.

Figure 3:
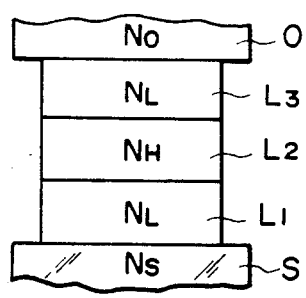
FIG. 3 is a schematic view showing an embodiment of the beam splitter in accordance with the present invention which is of the prism type and comprises three film layers.

FIG. 3 shows an embodiment of the beam splitter in accordance with the present invention wherein the multilayer interference film L shown in FIG. 2 consists of three film layers. The beam splitter shown in FIG. 3 comprises a substrate S having a refractive index $N_S$ and made, for example, of a vitreous material such as BK7, a first layer L1 which is a low refractive index film layer having a refractive index $N_L$, a second layer L2 which is a high refractive index film layer having a refractive index $N_H$, a third layer L3 which is the low refractive index film layer as in the first layer L1, and an adhesive layer O of a refractive index $N_O$. Each of the layers L1 to L3 has an optical film thickness of substantially $\lambda_0/4$ wherein $\lambda_0$ is the standard design wavelength. When the beam splitter is used in a photo-disk reproducing system using a near infrared laser generator, the standard design wavelength $\lambda_0$ is determined to be, for example, 925 nm. The refractive index of the substrate S, i.e. the incidence side refractive index $N_S$ is then determined to be, for example, 1.52. The refractive index of the adhesive layer O, i.e. the transmission side refractive index $N_O$ is determined to be, for example, 1.56. Further, the refractive index $N_L$ of the low refractive index film layers L1 and L3 is fixed at, for example, 1.90 ($>N_S$).

Figure 5:
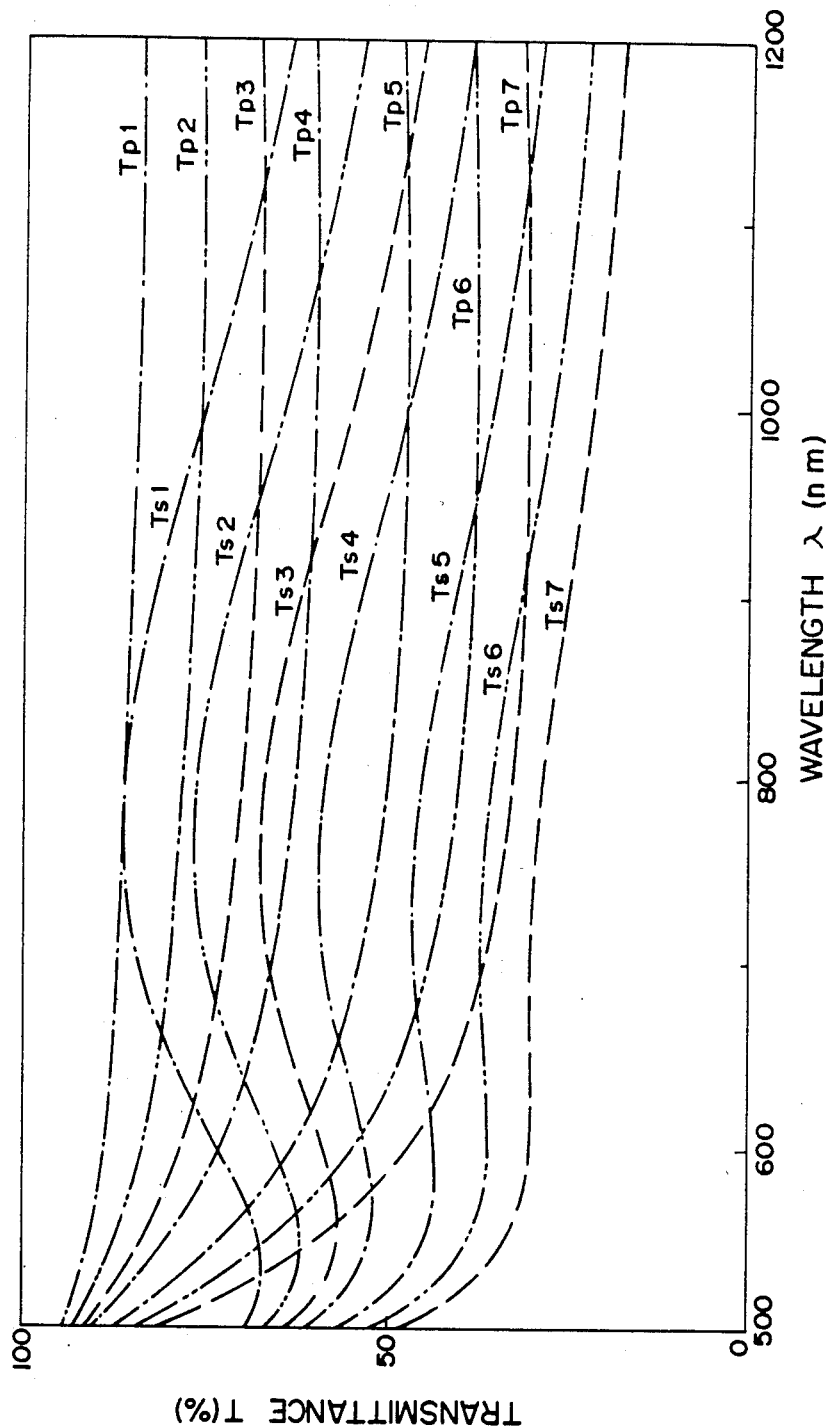
FIG. 5 is a graph showing an example of the spectral transmission characteristics of the embodiment of FIG. 3, FIGS. 6 to 8 are graphs showing examples of spectral transmission characteristics obtained when the number of film layers is five, seven, and nine, respectively in the embodiment of FIG. 4.

FIG. 5 shows the spectral transmission characteristics for the P and S polarized light components, which are obtained when the angle of incidence is 45° and the refractive index $N_H$ of the high refractive index film layer L2 is changed under the aforesaid conditions. In FIG. 5, curves $T_P1$ to $T_P7$ designate the transmitting characteristics for the P polarized light component, and curves $T_S1$ to $T_S7$ designate the transmitting characteristics for the S polarized light component. The relationship between these characteristics and the refractive index $N_H$ of the high refractive index film layer is shown in Table 1.

TABLE 1

| T | (FIG. 5, three film layers) | | | | | | |
|---|---|---|---|---|---|---|---|
| | $N_H$ | | | | | | |
| | 3.50 | 4.00 | 4.50 | 5.00 | 6.00 | 7.00 | 8.00 |
| $T_P$ | $T_P1$ | $T_P2$ | $T_P3$ | $T_P4$ | $T_P5$ | $T_P6$ | $T_P7$ |
| $T_S$ | $T_S1$ | $T_S2$ | $T_S3$ | $T_S4$ | $T_S5$ | $T_S6$ | $T_S7$ |

As is clear from FIG. 5, in the prism type beam splitter comprising three film layers and adjusted under the conditions described above, the transmittance $T_S$ for the S polarized light component is the maximum within the wavelength range of about 700 nm to 800 nm. Particularly, when $N_H$ is 3,50, $T_P1$ and $T_S1$ are equally 86% near a wavelength of 800 nm, and the transmittance becomes equal both for the P and S polarized light components. Accordingly, for light having a wavelength λ within the range of 750 nm to 820 nm, a beam splitter having a transmittance of 86% regardless of the ratio of the P and S polarized light components to each other can be obtained by forming the low refractive index film layers having the $N_L$ of 1.90 as the first and third film layers, and the high refractive index film layer having the $N_H$ of 3.50 as the second film layer.

Figure 4:
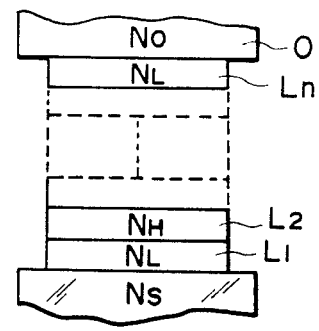
FIG. 4 is a schematic view showing an embodiment of the beam splitter in accordance with the present invention which is of the prism type and comprises "n" film layers.
Figure 6:
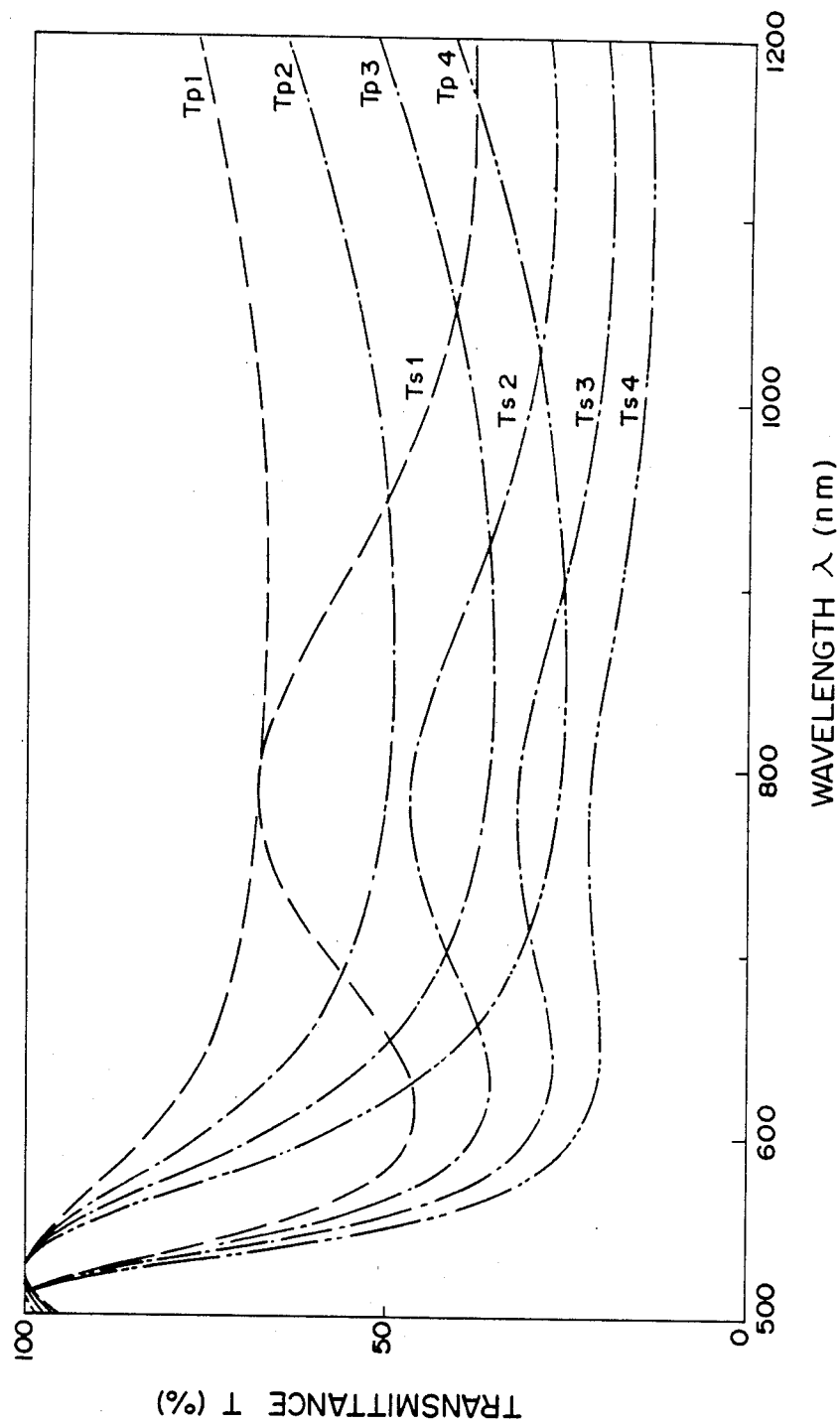
Figure 7:
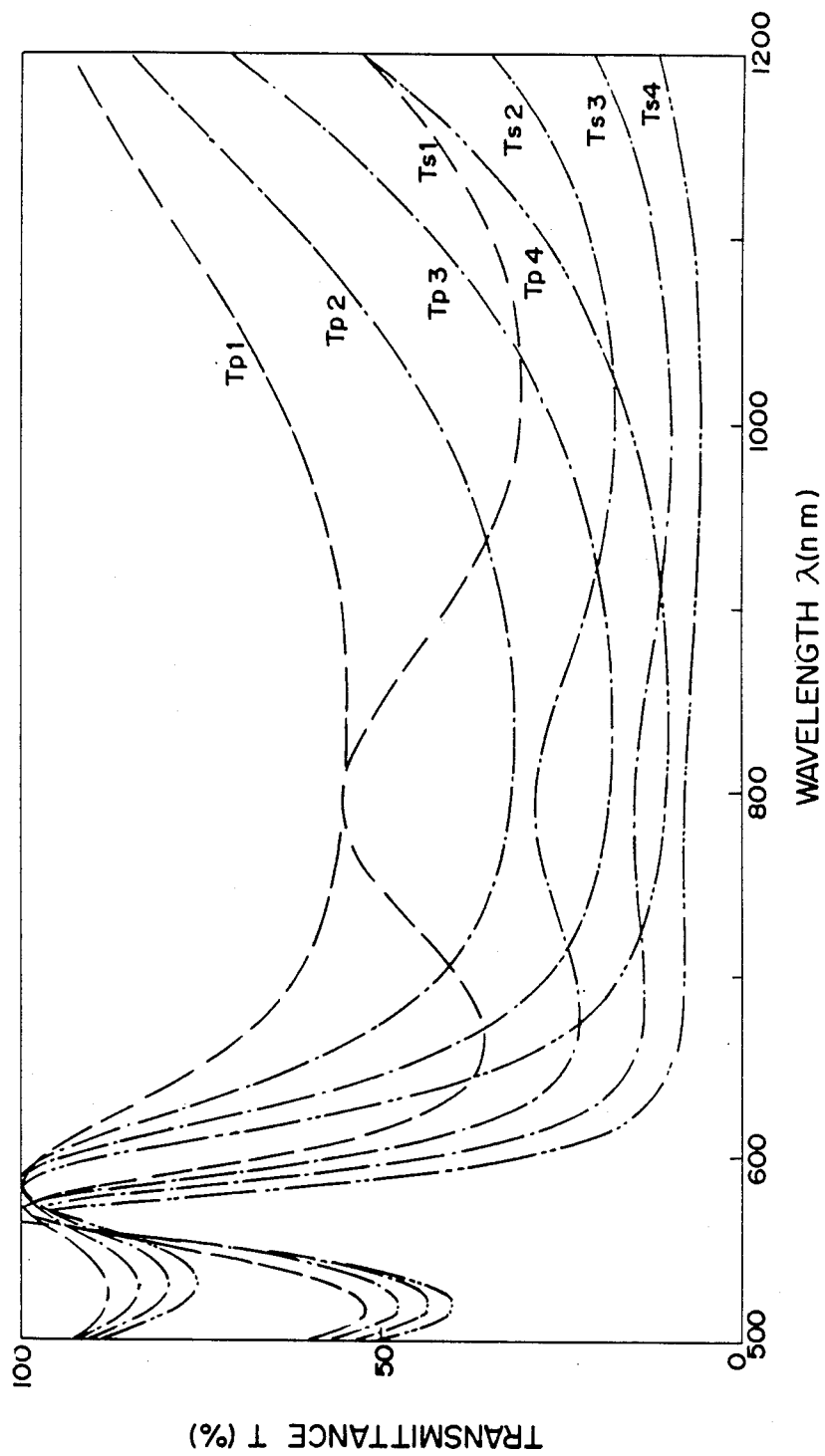
Figure 8:
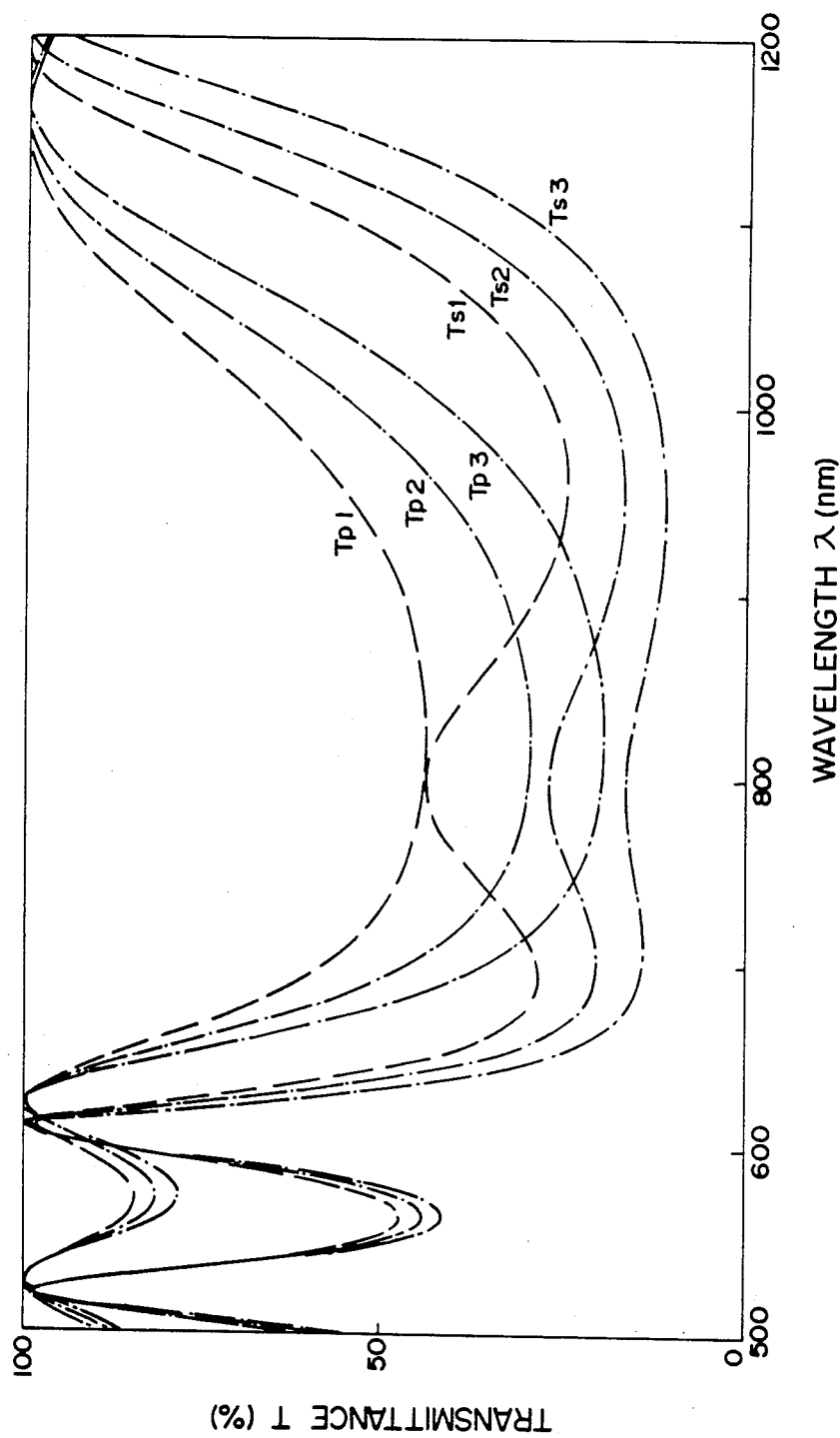

FIG. 4 shows an embodiment of the beam splitter in accordance with the present invention which is of the prism type and comprises "n" film layers. In this embodiment, a low refractive index film layer having a refractive index $N_L$ and a film thickness of $\lambda_0/4$ is formed as the first film layer, and a high refractive index film layer having a refractive index $N_H$ and a film thickness of $\lambda_0/4$ is formed as the second layer. In this manner, "n" film layers are stacked sequentially so that the uppermost film layer, i.e. the n-th film layer is a low refractive index layer. (Accordingly, the total number of film layers is odd.) FIGS. 6, 7, and 8 show spectral transmission characteristics obtained in the same manner as described with respect to FIG. 5 when the number of film layers in FIG. 4 is five, seven, and nine, respectively. In FIGS. 6 to 8, the standard design wavelength, the refractive index $N_L$ of the low refractive index film layers, and the refractive indices $N_H$ of the high refractive index film layers are shown in Tables 2 to 4. (The incidence side refractive index $N_S$, the transmission side refractive index $N_O$, and the angle of incidence are the same as in FIG. 5.)

TABLE 2

| (FIG. 6, five film layers) | | | | |
|---|---|---|---|---|
| $\lambda_0$ | | 890 nm | | |
| $N_L$ | | 2.145 | | |
| | | $N_H$ | | |
| T | 3.50 | 4.00 | 4.50 | 5.00 |
| $T_P$ | $T_P1$ | $T_P2$ | $T_P3$ | $T_P4$ |
| $T_S$ | $T_S1$ | $T_S2$ | $T_S3$ | $T_S4$ |

TABLE 3

| (FIG. 7, seven film layers) | | | | |
|---|---|---|---|---|
| $\lambda_0$ | | 880 nm | | |
| $N_L$ | | 2.325 | | |
| | | $N_H$ | | |
| T | 3.50 | 4.00 | 4.50 | 5.00 |
| $T_P$ | $T_P1$ | $T_P2$ | $T_P3$ | $T_P4$ |
| $T_S$ | $T_S1$ | $T_S2$ | $T_S3$ | $T_S4$ |

TABLE 4

| (FIG. 8, nine film layers) | | | |
|---|---|---|---|
| $\lambda_0$ | | 875 nm | |
| $N_L$ | | 2.45 | |
| | | $N_H$ | |
| T | 3.50 | 3.75 | 4.00 |
| $T_P$ | $T_P1$ | $T_P2$ | $T_P3$ |
| $T_S$ | $T_S1$ | $T_S2$ | $T_S3$ |

As shown in FIGS. 6 to 8, the transmittance $T_P$ for the P polarized light component and the transmittance $T_S$ for the S polarized light component can be made equal to each other at a wavelength λ near 800 nm under the respective conditions. Further, the transmittances $T_P$ and $T_S$ can also be adjusted as desired within a certain range by selecting the number of film layers. Of course, the $T_P$ and $T_S$ can also be adjusted to values different from each other.

Figure 9:
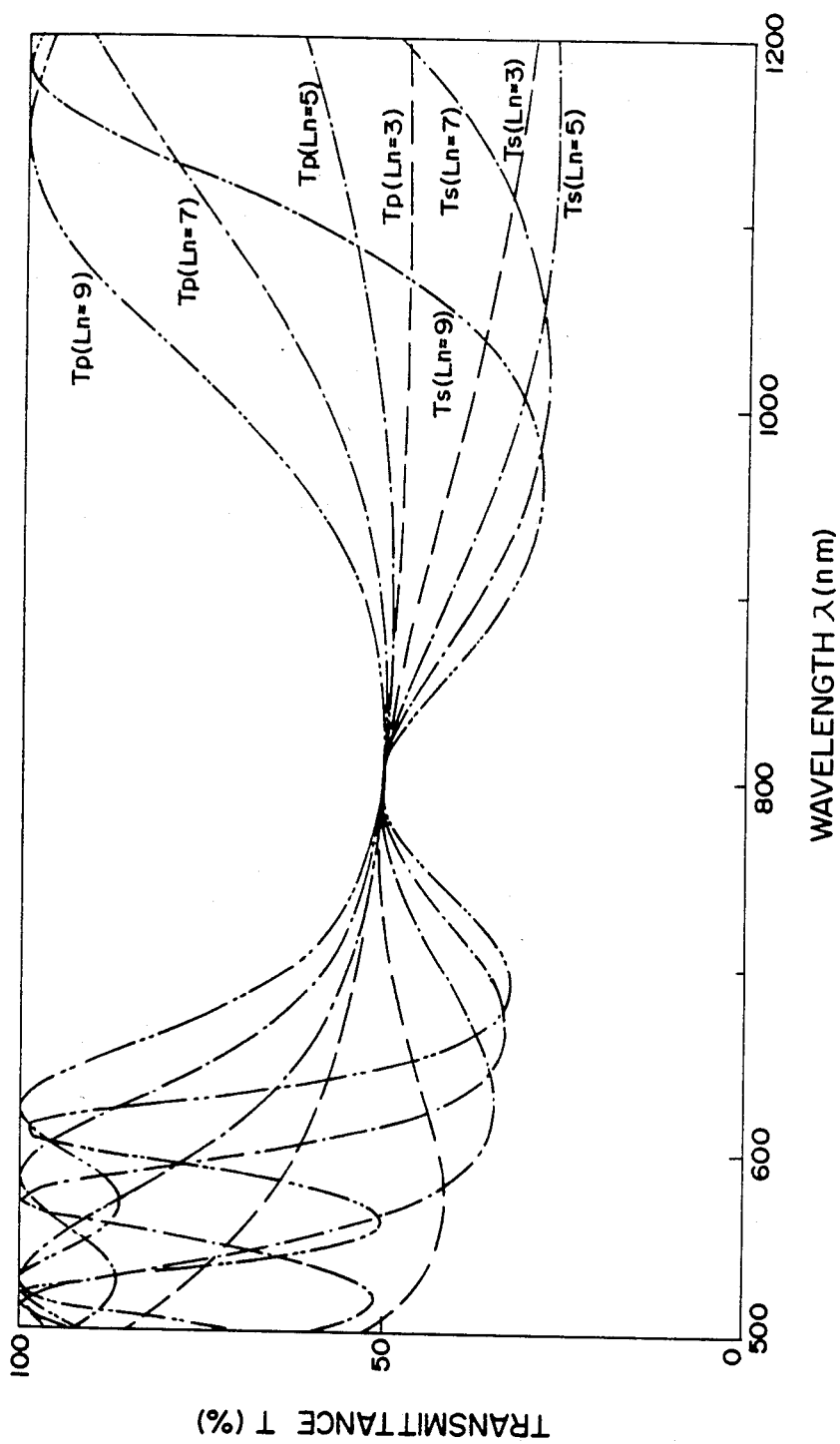
FIG. 9 is a graph showing the spectral transmission characteristics of an embodiment of the beam splitter in accordance with the present invention which is of the prism type, wherein the transmittance is equal both for the P and S polarized light components.

When the beam splitter in accordance with the present invention is used in the photo-disk reproducing optical system as described above, it is desired from the viewpoint of the light use efficiency that the beam splitter exhibit 50% transmission and that the transmittance be equal both for the P and S polarized light components. Table 5 shows the refractive index conditions of the beam splitters comprising three to nine film layers for satisfying the aforesaid need. In Table 5, the incidence side refractive index $N_S$, the transmission side refractive index $N_O$, and the angle of incidence are the same as the conditions described above, and it is intended that the desired characteristics are obtained at a wavelength λ of 800 nm. FIG. 9 shows the spectral transmission characteristics of the beam splitters as shown in Table 5 for the P and S polarized light components.

TABLE 5

| (FIG. 9) | | | |
|---|---|---|---|
| Number of layers (Ln) | $\lambda_0$ (nm) | $N_L$ | $N_H$ |
| 3 | 925 | 1.975 | 6.225 |
| 5 | 890 | 2.210 | 4.130 |
| 7 | 880 | 2.340 | 3.610 |
| 9 | 875 | 2.420 | 3.375 |

As shown in FIG. 9, it is possible to obtain a beam splitter comprising a desired number of film layers and exhibiting 50% transmission (both for the P and S polarized light components) by determining the refractive indices $N_H$ and $N_L$ of the high and low refractive index film layers according to the number of film layers. However, in the vicinity of the range wherein the transmittance is approximately equal both for the P and S polarized light component, there is a tendency of the shape of the curve of the transmittance $T_S$ for the S polarized light component becoming sharper as the number of film layers is increased. Therefore, from the viewpoint of the fluctuation in manufacturing conditions, it is advantageous that the number of film layers be smaller. However, as will be described below, when the number of film layers is reduced, for example, to three, the tolerance of the refractive index $N_L$ of the low refractive index film layers becomes narrow.

Figure 10:
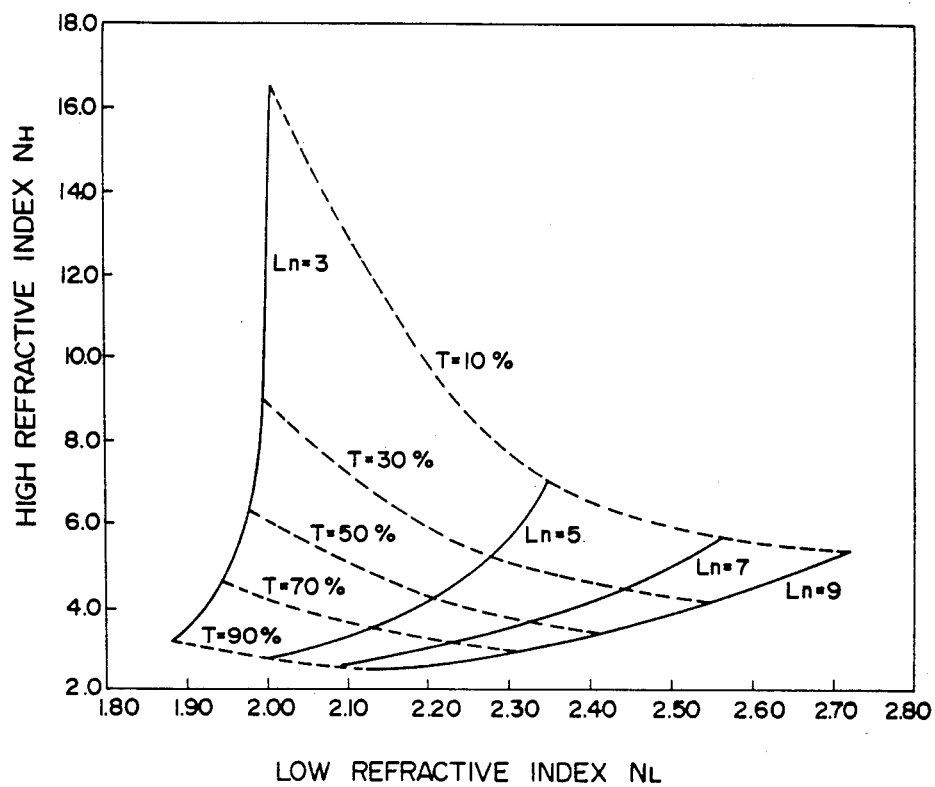
FIG. 10 is a graph showing the relationship between the refractive indices $N_L$ and $N_H$ at which the embodiments of the beam splitter in accordance with the present invention which are of the prism type and comprise three, five, seven, and nine film layers, respectively, exhibit an equal transmittance both for the P and S polarized light components.

FIG. 10 shows the conditions of the high refractive index $N_H$ of the high refractive index film layer and the refractive index $N_L$ of the low refractive index film layer, which are necessary to obtain an equal transmittance both for the P and S polarized light components in the vicinity of a wavelength (λ) range of 800±20 nm, with respect to the number of film layers (Ln). The other conditions, i.e. the incidence side refractive index $N_S$, the angle of incidence, and the like are the same as the conditions described above. In FIG. 10, the broken lines designate the lines of equal transmittances T ($T_P=T_S$) for the P and S polarized light components.

As shown in FIG. 10, it is possible to equalize the transmittances $T_P$ and $T_S$ for the P and S polarized light components to each other in any number of film layers by adjusting the conditions of the refractive indices $N_H$ and $N_L$, and also to adjust the transmittances to any values. In general, however, the tolerance of the low refractive index $N_L$ becomes narrow as the number of film layers (Ln) is decreased, and the tolerance of the high refractive index $N_H$ becomes narrow as the number of film layers (Ln) is increased. In view of the above, a beam splitter comprising five film layers is advantageous since it is relatively easy to control the manufacturing process.

Figure 11:
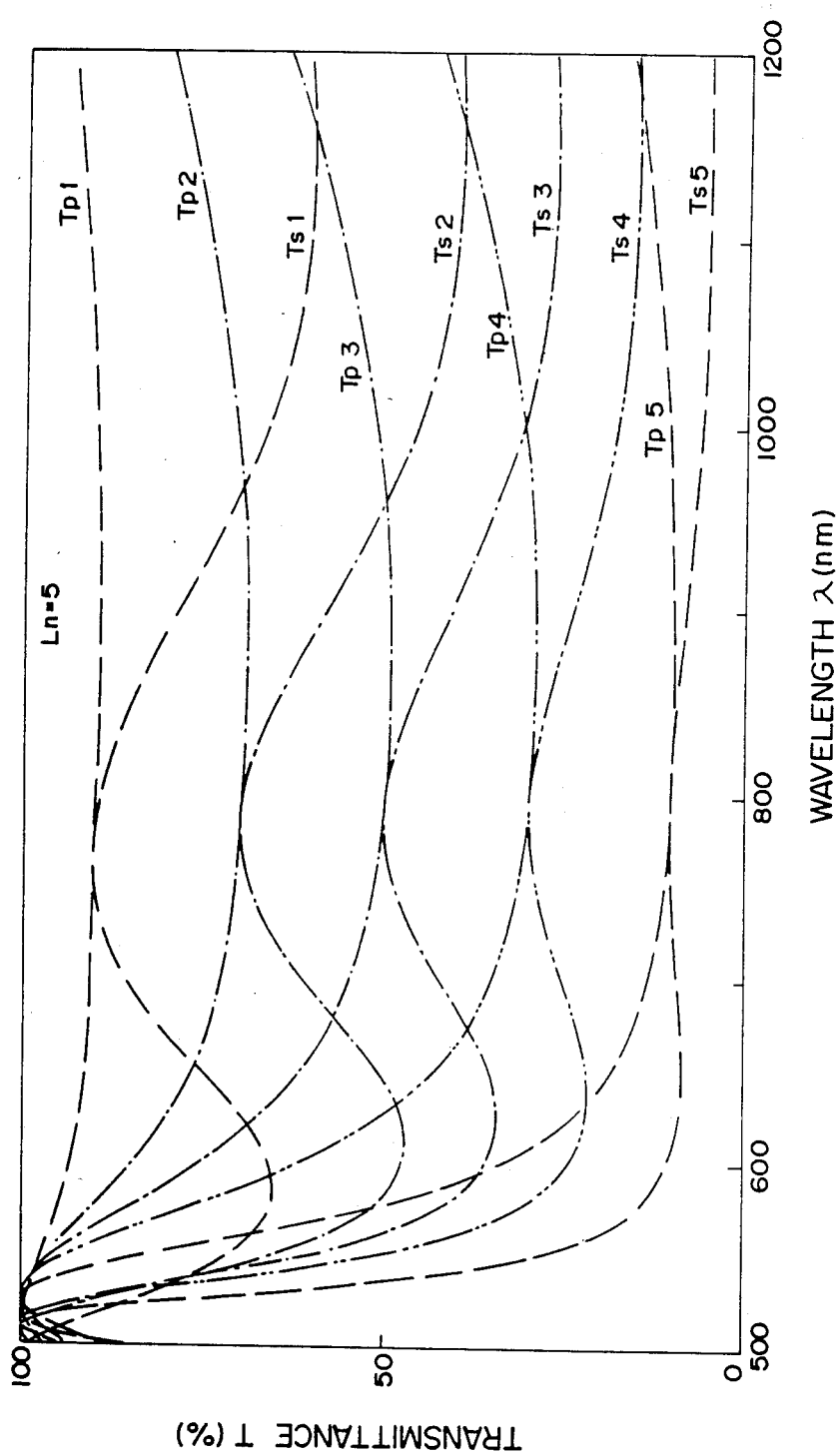
FIG. 11 is a graph showing the spectral transmission characteristics of an embodiment of the beam splitter in accordance with the present invention which is of the prism type and comprises five film layers and which can be employed when the refractive indices of the transparent substrate on the incidence side and the adhesive layer on the transmission side are high.

In the embodiments described above, the incidence side refractive index is determined to be 1.52, and the transmission side refractive index is determined to be 1.56. However, the present invention is not limited to these conditions. For example, when the laser generator used in the photo-disk reproducing optical system is a near infrared laser generator, it is sufficient that the substrate be transparent within the wavelength range of the near infrared laser, and therefore the substrate may be made of silicon or the like. FIG. 11 shows the spectral transmission characteristics of some beam splitters comprising five film layers and exhibiting the transmittances $T_P$ and $T_S$ for the P and S polarized light components which are equal to each other in the vicinity of a wavelength of 800 nm when the incidence side refractive index and the transmission side refractive index are 4.0. The angle of incidence is 45° in every case, and the refractive indices $N_H$ and $N_L$ of the respective film layers are shown in Table 6.

TABLE 6

| (FIG. 11, five film layers) | | | | | |
|---|---|---|---|---|---|
| $T_P$ | $T_{P1}$ | $T_{P2}$ | $T_{P3}$ | $T_{P4}$ | $T_{P5}$ |
| $T_S$ | $T_{S1}$ | $T_{S2}$ | $T_{S3}$ | $T_{S4}$ | $T_{S5}$ |
| $N_H$ | 7.00 | 8.90 | 10.73 | 13.21 | 18.50 |
| $N_L$ | 5.21 | 5.54 | 5.73 | 5.89 | 6.05 |

Figure 12:
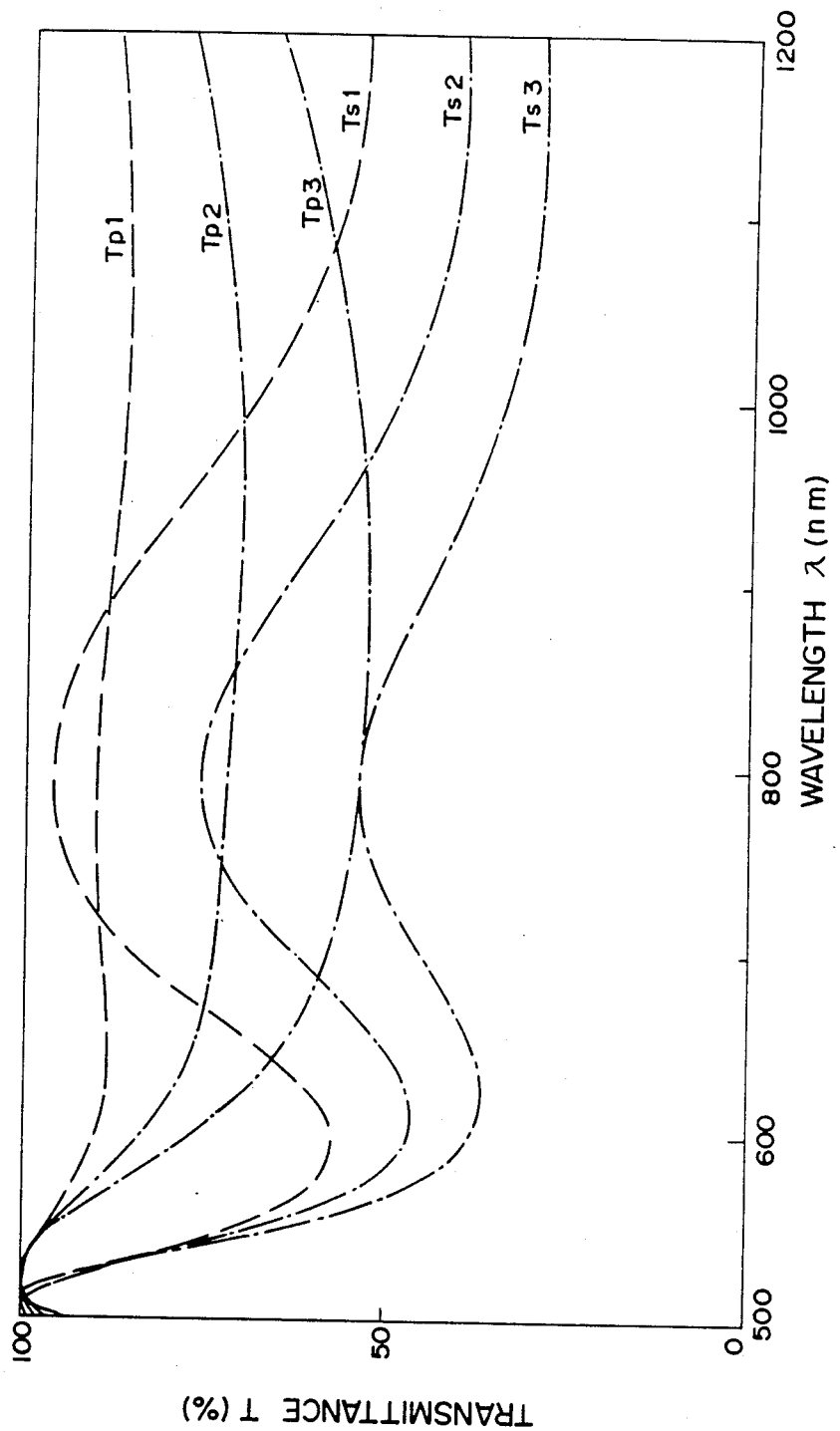
FIG. 12 is a graph showing the spectral transmission characteristics of an embodiment of the beam splitter in accordance with the present invention which is of the prism type, wherein the transmittance for the P polarized light component is lower than the transmittance for the S polarized light component.

Further, in the present invention, it is also possible to form the beam splitter so that the transmittance $T_P$ for the P polarized light component is lower than the transmittance $T_S$ for the S polarized light component within a predetermined wavelength range according to the refractive index conditions, as shown in FIG. 12. FIG. 12 shows the transmittances $T_P$ and $T_S$ for the P and S polarized light components obtained when the incidence side refractive index $N_S$ is 1.52, the transmission side refractive index $N_O$ is 1.56, the angle of incidence is 45°, the standard design wavelength $\lambda_0$ is 890 nm, the refractive index $N_L$ of the low refractive index film layers is fixed at 2.20, and the refractive index $N_H$ of the high refractive index film layers is changed. The number of film layers is five (the film thickness of each film layer is $\lambda_0/4$), and the relationship between the refractive index $N_H$ and the transmittances $T_P$ and $T_S$ is shown in Table 7.

TABLE 7

| (FIG. 12, five film layers) | | | |
|---|---|---|---|
| T | $N_H$ | | |
| | 3.00 | 3.50 | 4.00 |
| $T_P$ | $T_{P1}$ | $T_{P2}$ | $T_{P3}$ |
| $T_S$ | $T_{S1}$ | $T_{S2}$ | $T_{S3}$ |

In the present invention, the unique characteristics as shown in FIG. 12 which could not be obtained with the conventional beam splitter can be obtained easily. Thus, the present invention can provide various optical systems with novel functions.

Figure 13:
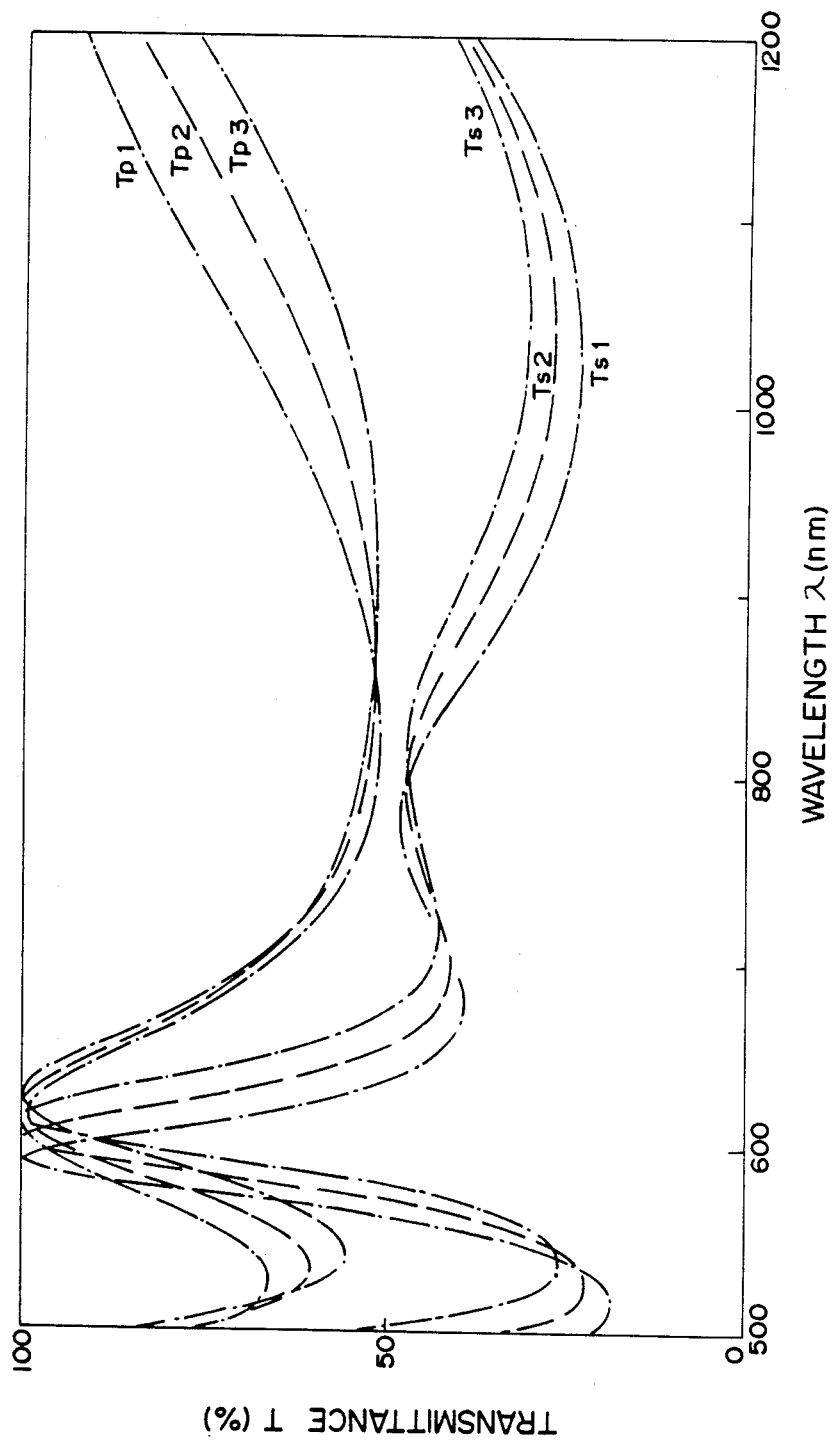
FIG. 13 is a graph showing the spectral transmission characteristics exhibited by an embodiment of the beam splitter in accordance with the present invention which is of the prism type and comprises seven film layers, wherein the thicknesses of the second and sixth film layers are slightly smaller than $\lambda_0/4$

FIG. 13 shows the characteristics of a further embodiment of the beam splitter in accordance with the present invention comprising seven film layers, which are obtained when the angle of incidence is changed. In this embodiment, the film thickness of the second and sixth film layers which are the high refractive index film layers is $0.55 \times (\lambda_0/4)$, and the thickness of the other film layers is $\lambda_0/4$. The incidence side refractive index $N_S$ is 1.52, the transmission side refractive index $N_O$ is 1.56, the refractive index $N_L$ of the low refractive index film layers is 2.20, the refractive index $N_H$ of the high refractive index film layers is 3.50, and the standard design wavelength $\lambda_0$ is 1035 nm. The relationship between the angle of incidence ($\alpha$) and the characteristics is shown in Table 8.

TABLE 8

| (FIG. 13, seven film layers) | | | |
|---|---|---|---|
| T | $\alpha$ | | |
| | 50° | 45° | 40° |
| $T_P$ | $T_{P1}$ | $T_{P2}$ | $T_{P3}$ |
| $T_S$ | $T_{S1}$ | $T_{S2}$ | $T_{S3}$ |

As described above, in the present invention, the film thickness of each film layer need not always be substantially $\lambda_0/4$. It will further be understood that a change in the angle of incidence ($\alpha$) results in a general wavelength shift as encountered in the conventional thin film optical system as a change in relative film thickness.

In the embodiments described above, the beam splitter in accordance with the present invention is constructed in the prism form. However, it is also possible to form the beam splitter in accordance with the present invention as a plate type. Various embodiments of the plate type beam splitter in accordance with the present invention will be described below.

FIG. 15 shows the characteristics of a further embodiment of the beam splitter in accordance with the present invention which is of the plate type. In FIG. 15, the beam splitter comprises a plate-like substrate 10 and a multilayer interference film L coated on the plate-like substrate 10 by deposition.

When the characteristics of the beam splitter formed as shown in FIG. 15 are adjusted so that the reflectance and the transmittance are respectively 50% both for the P and S polarized light component, incident light I entering the beam splitter from the left side of FIG. 15 is split into transmitted light T and reflected light R. When the incident light I contains the P polarized light component $I_P$ and the S polarized component $I_S$ respectively in a proportion of 50%, with the total light amount being 100, the amount of the transmitted light T is 50 ($T_P$:$T_S$=25:25), and the amount of the reflected light R is also 50 ($R_P$:$R_S$=25:25). Thus, the ratio of the P and S polarized light components to each other in the transmitted light T and the reflected light R is equal to the ratio of the P and S polarized light components, which are contained in the incident light I, to each other. Whichever the polarized light component ratio $I_P/I_S$ is in the incident light I, the component ratio does not change in the transmitted light and the reflected light. This is merely an example of the characteristics obtainable with the embodiment of the beam splitter shown in accordance with the present invention shown in FIG. 15.

FIG. 16 shows an embodiment of the beam splitter in accordance with the present invention wherein the multilayer interference film L shown in FIG. 15 consists of three film layers. The beam splitter shown in FIG. 16 comprises a substrate S having a refractive index $N_S$ and made, for example, of a vitreous material such as BK7, a first layer L1 which is a low refractive index film layer having a refractive index $N_L$, a second layer L2 which is a high refractive index film layer having a refractive index $N_H$, and a third layer L3 which is the low refractive index film layer as in the first layer L1. The ambient medium is air having a refractive index $N_O$ of 1.0. Each of the layers L1 to L3 has an optical film thickness of substantially $\lambda_0/4$ wherein $\lambda_0$ is the standard design wavelength.

FIG. 17 shows an embodiment of the beam splitter in accordance with the present invention which is of the plate type and comprises "n" film layers. In this embodiment, a low refractive index film layer having a refractive index $N_L$ and a film thickness of $\lambda_0/4$ is formed as the first film layer, and a high refractive index film layer having a refractive index $N_H$ and a film thickness of $\lambda_0/4$ is formed as the second layer. In this manner, "n" film layers are stacked sequentially so that the uppermost film layer, i.e. the n-th film layer is a low refractive index layer. (Accordingly, the total number of film layers is odd.)

When the beam splitter in accordance with the present invention as shown in FIG. 17 is used in the photo-disk reproducing optical system using a near infrared laser generator, it is desired from the viewpoint of the light use efficiency that the beam splitter exhibit 50% transmission and that the transmittance be equal both for the P and S polarized light components. Table 9 shows the refractive index conditions of the beam splitters comprising three to nine film layers for satisfying the aforesaid need. In Table 9, the incidence side refractive index $N_O$ is 1.0, the transmission side refractive index $N_S$ is 1.52, the angle of incidence if 45°, and it is intended that the desired characteristics are obtained at a wavelength $\lambda$ of 800 nm. FIG. 18 shows the spectral transmission characteristics of the beam splitters as shown in Table 9 for the P and S polarized light components.

TABLE 9

| (FIG. 18) | | | |
|---|---|---|---|
| Number of layers (Ln) | $\lambda_0$ (nm) | $N_L$ | $N_H$ |
| 3 | 890 | 1.510 | 4.500 |
| 5 | 860 | 1.690 | 3.075 |
| 7 | 855 | 1.788 | 2.716 |
| 9 | 850 | 1.860 | 2.570 |

As shown in FIG. 18, it is possible to obtain a beam splitter comprising a desired number of film layers and exhibiting 50% transmission (both for the P and S polarized light components) by determining the refractive indices $N_H$ and $N_L$ of the high and low refractive index film layers according to the number of film layers. However, in the vicinity of the range wherein the transmittance is approximately equal both for the P and S polarized light component, there is a tendency of the shape of the curve of the transmittance $T_S$ for the S polarized light component becoming sharper as the number of film layers is increased. Therefore, from the viewpoint of the fluctuation in manufacturing conditions and the dependence on the angle of incidence, it is advantageous that the number of film layers be smaller.

Figure 19:
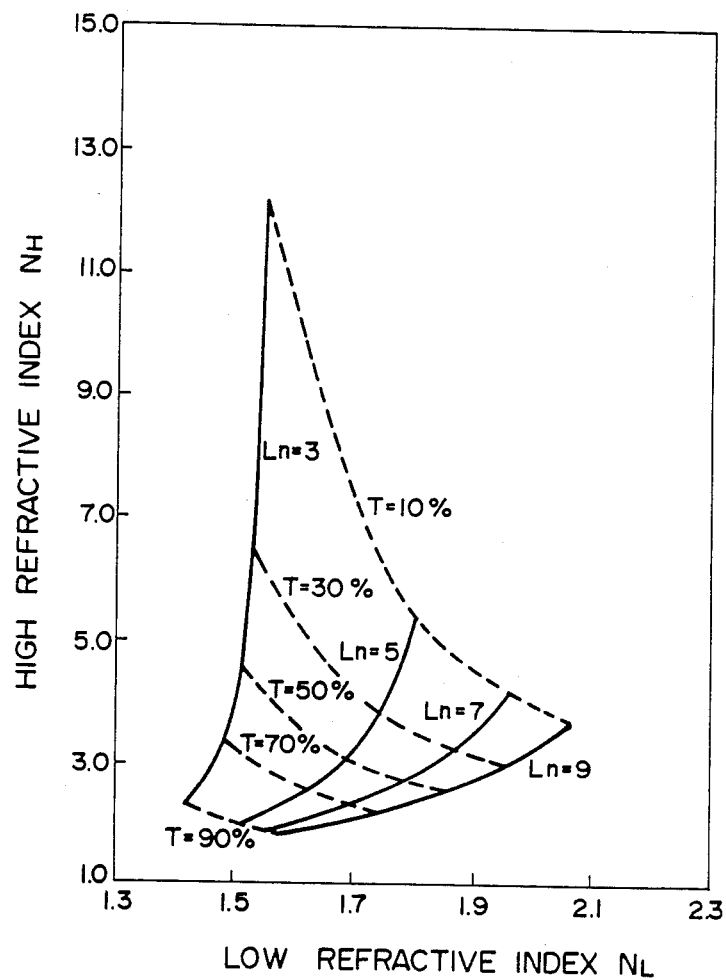
FIG. 19 is a graph showing the relationship between the refractive indices $N_L$ and $N_H$ at which the embodiments of the beam splitter in accordance with the present invention which are of the plate type and comprise three, five, seven and nine film layers, respectively, exhibit an equal transmittance both for the P and S polarized light components.

FIG. 19 shows the conditions of the high refractive index $N_H$ of the high refractive index film layer and the refractive index $N_L$ of the low refractive index film layer, which are necessary to obtain an equal transmittance both for the P and S polarized light components in the vicinity of a wavelength ($\lambda$) range of 800±20 nm, with respect to the number of film layers (Ln). The other conditions, i.e. the transmission side refractive index $N_S$, the angle of incidence, and the like are the same as the conditions described above. In FIG. 19, the broken lines designate the lines of equal transmittances T ($T_P = T_S$) for the P and S polarized light components.

As shown in FIG. 19, it is possible to equalize the transmittances $T_P$ and $T_S$ for the P and S polarized light components to each other in any number of film layers by adjusting the conditions of the refractive indices $N_H$ and $N_L$, and also to adjust the transmittances to any values.

Figure 20:
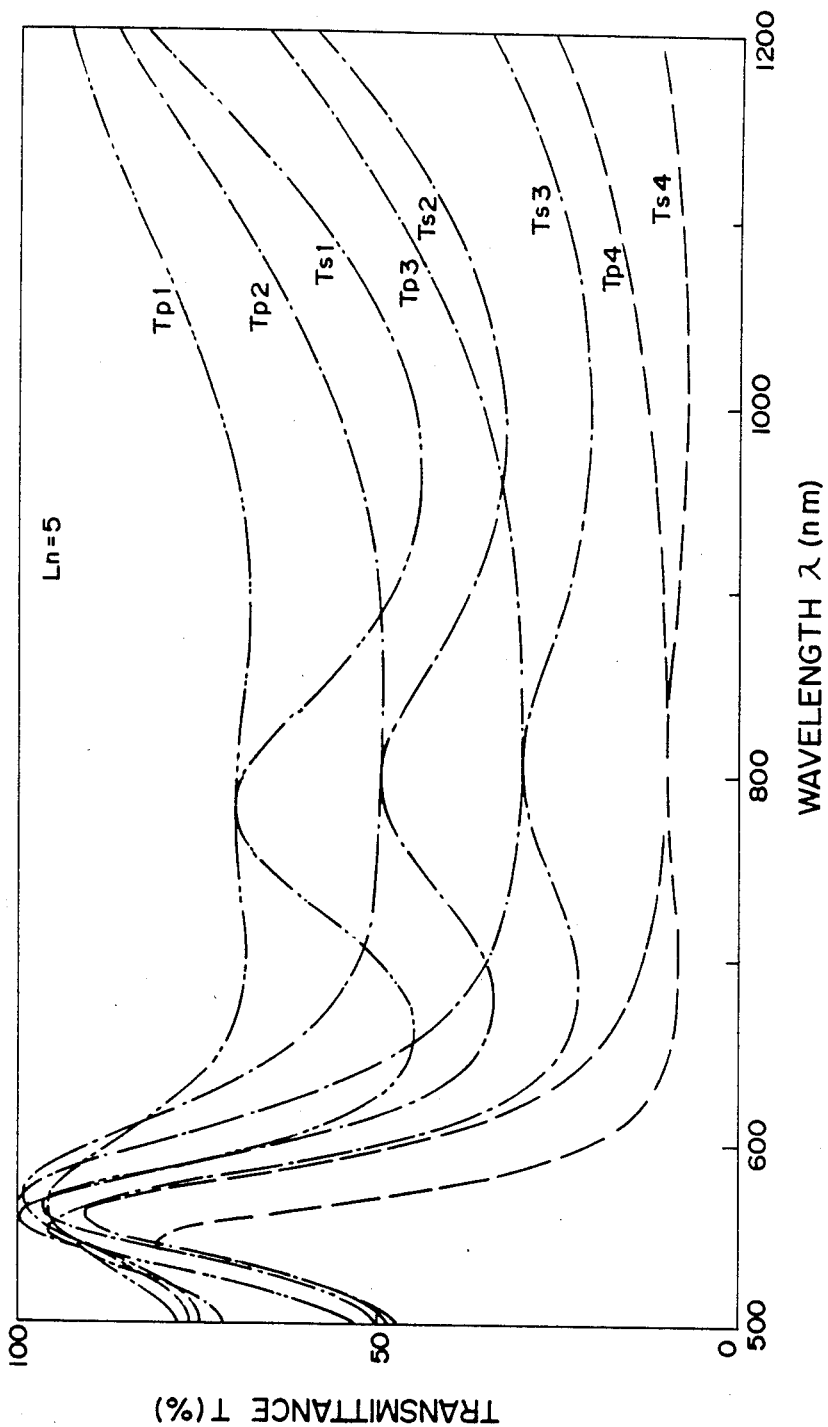
FIG. 20 is a graph showing the spectral transmission characteristics of an embodiment of the beam splitter in accordance with the present invention which is of the plate type and comprises five film layers and which can be employed when the refractive index of the transparent substrate is high.

In the embodiments of the plate type beam splitter described above, the incidence side refractive index is 1.0, and the transmission side refractive index is determined to be 1.52. However, the present invention is not limited to these conditions. For example, when the laser generator used in the photo-disk reproducing optical system is a near infrared laser generator, the substrate may be made of silicon, germanium, or the like. FIG. 20 shows the spectral transmission characteristics of some beam splitters comprising five film layers and exhibiting the transmittances $T_P$ and $T_S$ for the P and S polarized light components which are equal to each other in the vicinity of a wavelength of 800 nm when the incidence side refractive index is 1.0 and the transmission side refractive index is 4.0. The angle of incidence is 45° in every case, and the refractive indices $N_H$ and $N_L$ of the respective film layers are shown in Table 10.

TABLE 10

| | (FIG. 20, five film layers) | | | |
|---|---|---|---|---|
| $T_P$ | $T_{P1}$ | $T_{P2}$ | $T_{P3}$ | $T_{P4}$ |
| $T_S$ | $T_{S1}$ | $T_{S2}$ | $T_{S3}$ | $T_{S4}$ |
| $N_H$ | 1.625 | 1.779 | 1.890 | 2.000 |
| $N_L$ | 1.992 | 2.608 | 3.365 | 4.952 |

Figure 21:
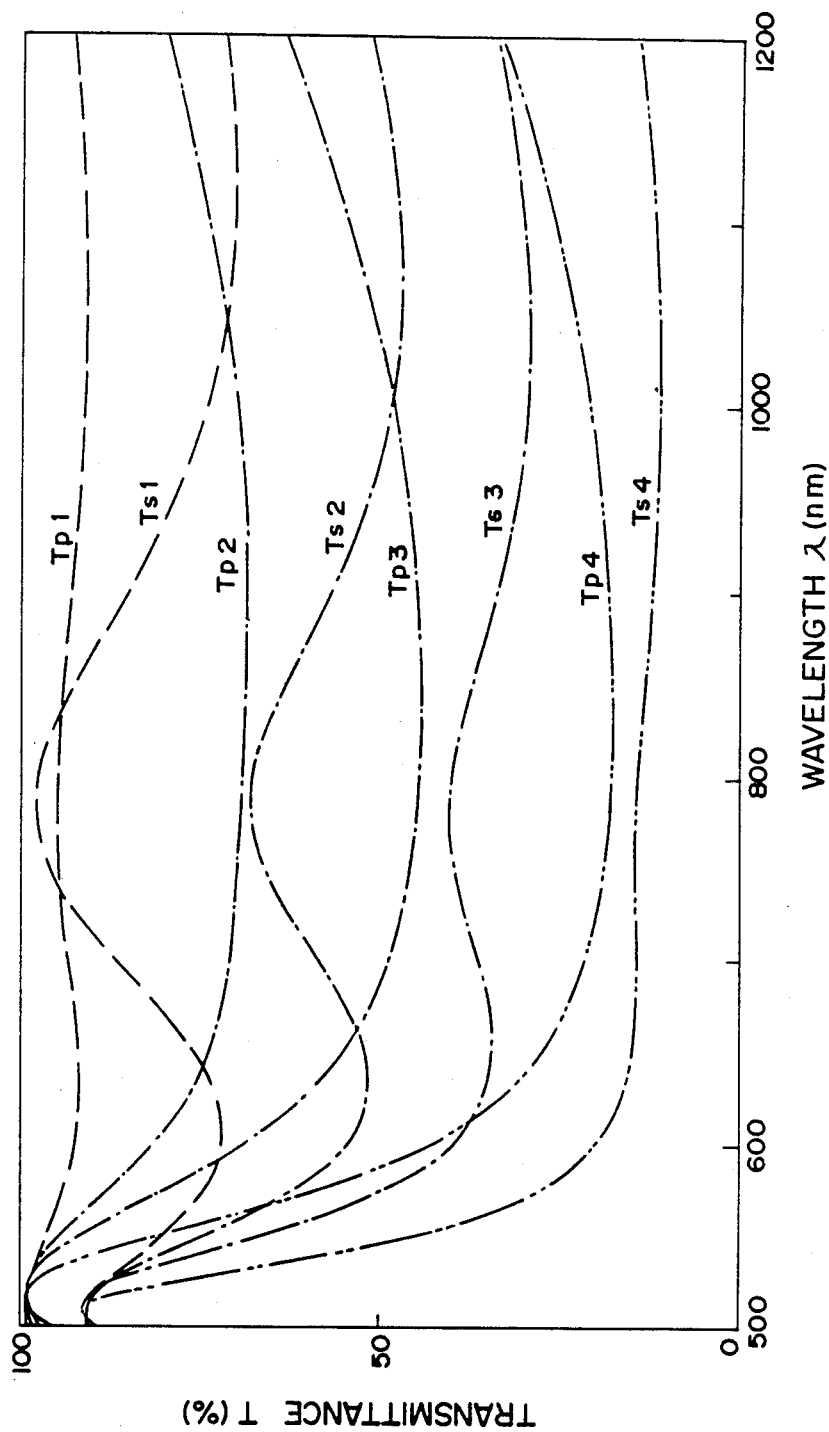
FIG. 21 is a graph showing the spectral transmission characteristics of an embodiment of the beam splitter in accordance with the present invention which is of the plate type and comprises and odd number of film layers, wherein the transmittance $T_P$ for the P polarized light component is lower than the transmittance $T_S$ for the S polarized light component, and the ratios $T_P:T_S$ and $(T_P+T_S):(R_P+R_S)$ can take arbitrary values.

Further, in the present invention, it is also possible to form the plate type beam splitter so that the transmittance $T_P$ for the P polarized light component is lower than the transmittance $T_S$ for the S polarized light component within a predetermined wavelength range according to the refractive index conditions, as shown in FIG. 21. ($T_{P1} < T_{S1}$ in FIG. 21) Further, the ratio $T_P:T_S$ and the ratio $(T_P + T_S):(R_P:R_S)$ can be adjusted as desired. FIG. 21 shows the transmittances $T_P$ and $T_S$ for the P and S polarized light components obtained when the incidence side refractive index $N_O$ is 1.0, the transmission side refractive index $N_S$ is 1.52, the angle of incidence is 45°, the standard design wavelength $\lambda_0$ is 860 nm, the refractive index $N_L$ of the low refractive index film layers is fixed at 1.60, and the refractive index $N_H$ of the high refractive index film layers is changed. The number of film layers is five (the optical film thickness of each film layer is $\lambda_0/4$), and the relationship between the refractive index $N_H$ and the transmittances $T_P$ and $T_S$ is shown in Table 11.

TABLE 11

| | (FIG. 21, five film layers) | | | |
|---|---|---|---|---|
| | | $N_H$ | | |
| T | 2.00 | 2.50 | 3.00 | 4.00 |
| $T_P$ | $T_{P1}$ | $T_{P2}$ | $T_{P3}$ | $T_{P4}$ |

TABLE 11-continued (FIG. 21, five film layers)

| T | $N_H$ | | | |
|---|---|---|---|---|
| | 2.00 | 2.50 | 3.00 | 4.00 |
| $T_S$ | $T_{S1}$ | $T_{S2}$ | $T_{S3}$ | $T_{S4}$ |

In the present invention, the unique characteristics as shown in FIG. 21 which could not be obtained with the conventional beam splitter can be obtained easily. Thus, the present invention can provide various optical systems with novel functions.

Also in the embodiments of FIGS. 16 to 21, the optical film thickness of each film layer is substantially $\lambda_0/4$. However, it is also possible to obtain the desired spectral characteristics by changing the film thickness since the optical thickness for determining the phase of each film layer is a function of the refractive index and the film thickness.

In all embodiments described above, the multilayer interference film L of the beam splitter consists of an odd number of film layers. However, the multilayer interference film L may consists of an even number of film layers. Various embodiments of the beam splitter in accordance with the present invention which are of the plate type as shown in FIG. 15 and provided with an even number of film layers will now be describd below with reference to FIGS. 22 to 27.

FIG. 22 shows an embodiment of the beam splitter in accordance with the present invention wherein the multilayer interference film L shown in FIG. 15 consists of two film layers. The beam splitter shown in FIG. 22 comprises a substrate S having a refractive index $N_S$ and made, for example, of a vitreous material such as BK7, a first layer L1 which is a low refractive index film layer having a refractive index $N_L$, and a second layer L2 which is a high refractive index film layer having a refractive index $N_H$. The ambient medium is air having a refractive index $N_O$ of 1.0. Each of the layers L1 and L2 has an optical film thickness of substantially $\lambda_0/4$ wherein $\lambda_0$ is the standard design wavelength.

FIG. 23 shows an embodiment of the beam splitter in accordance with the present invention which is of the plate type and comprises "n" film layers. In this embodiment, a high refractive index film layer having a refractive index $N_H$ and a film thickness of $\lambda_0/4$ is formed as the first film layer, and a low refractive index film layer having a refractive index $N_L$ and a film thickness of $\lambda_0/4$ is formed as the second layer. In this manner, "n" film layers are stacked sequentially so that the uppermost film layer, i.e. the n-th film layer is a low refractive index layer. (Accordingly, the total number of film layers is even.)

Figure 24:
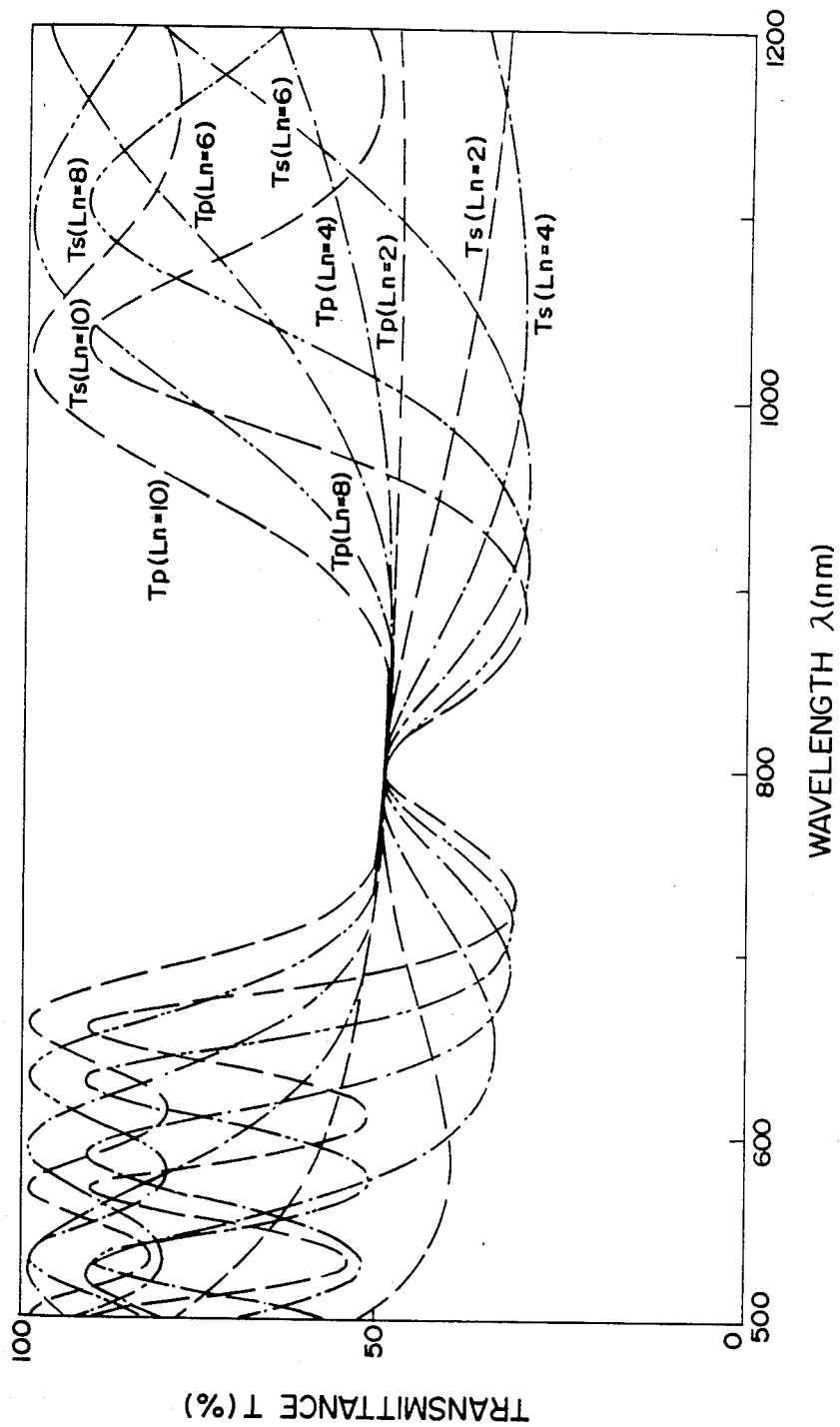
FIG. 24 is a graph showing the spectral transmission characteristics of an embodiment of the beam splitter in accordance with the present invention which is of the plate type and comprises an even number of film layers wherein the transmittance is equal both for the P and S polarized light components.

When the beam splitter in accordance with the present invention as shown in FIG. 23 is used in the photo-disk reproducing optical system using a near infrared laser generator, it is desired from the viewpoint of the light use efficiency that the beam splitter exhibit 50% transmission and that the transmittance be equal both for the P and S polarized light components. Table 12 shows the refractive index conditions of the beam splitters comprising two to ten film layers for satisfying the aforesaid need. In Table 12, the incidence side refractive index $N_O$ is 1.0, the transmission side refractive index $N_S$ is 1.52, the angle of incidence is 45°, and it is intended that the desired characteristics are obtained at a wavelength $\lambda$ of 800 nm. FIG. 24 shows the spectral transmission characteristics of the beam splitters as shown in Table 12 for the P and S polarized light components.

TABLE 12

(FIG. 24)

| Number of layers (Ln) | $\lambda_0$ (nm) | $N_L$ | $N_H$ |
|---|---|---|---|
| 2 | 890 | 1.495 | 4.480 |
| 4 | 850 | 1.800 | 3.100 |
| 6 | 845 | 1.968 | 2.830 |
| 8 | 843 | 2.047 | 2.690 |
| 10 | 842 | 2.094 | 2.604 |

As shown in FIG. 24, it is possible to obtain a beam splitter comprising a desired number of film layers and exhibiting 50% transmission (both for the P and S polarized light components) by determining the refractive indices $N_H$ and $N_L$ of the high and low refractive index film layers according to the number of film layers. However, in the vicinity of the range wherein the transmittance is approximately equal both for the P and S polarized light component, there is a tendency of the shape of the curve of the transmittance $T_S$ for the S polarized light component becoming sharper as the number of film layers is increased. Therefore, from the viewpoint of the fluctuation in manufacturing conditions and the dependence on the angle of incidence, it is advantageous that the number of film layers be smaller.

Figure 25:
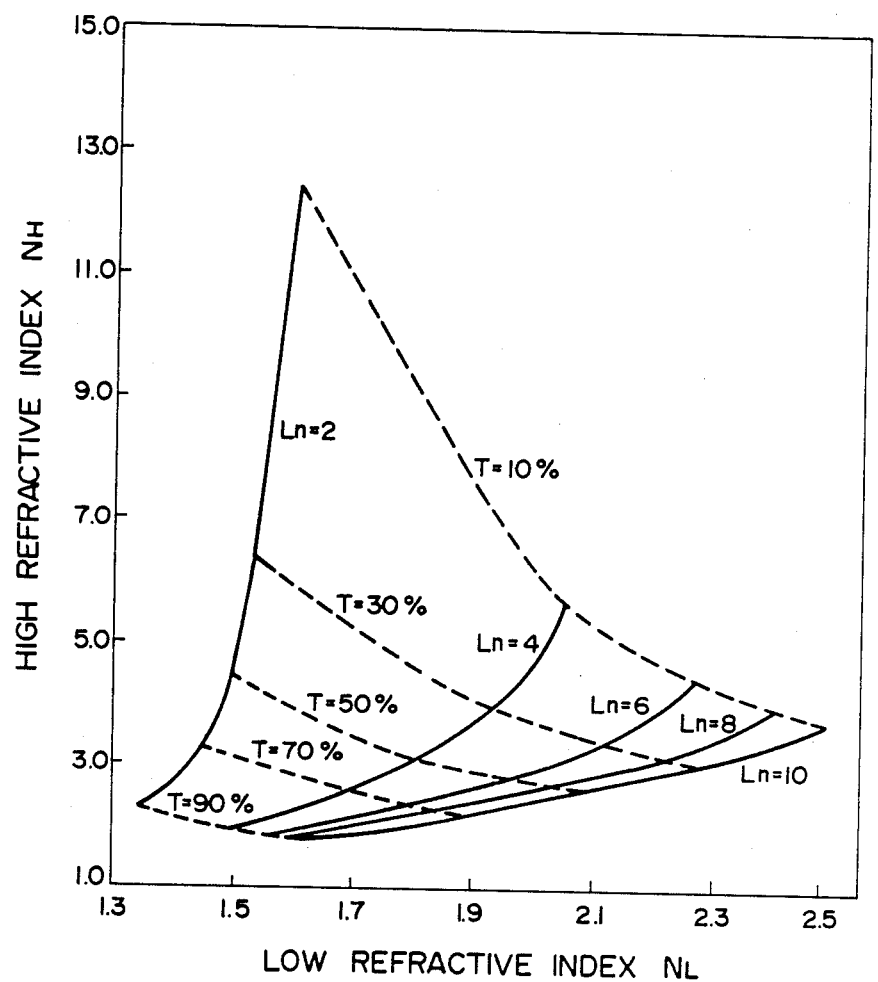
FIG. 25 is a graph showing the relationship between the refractive indices $N_L$ and $N_H$ at which the embodiments of the beam splitter in accordance with the present invention which are of the plate type and comprise two, four, six, eight, and ten film layers, respectively, exhibit an equal transmittance both for the P and S polarized light components.

FIG. 25 shows the conditions of the high refractive index $N_H$ of the high refractive index film layer and the refractive index $N_L$ of the low refractive index film layer, which are necessary to obtain an equal transmittance both for the P and S polarized light components in the vicinity of a wavelength ($\lambda$) range of 800±20 nm, with respect to the number of film layers (Ln). The other conditions, i.e. the transmission side refractive index $N_S$, the angle of incidence, and the like are the same as the conditions described above. In FIG. 25, the broken lines designate the lines of equal transmittances T ($T_P = T_S$) for the P and S polarized light components.

As shown in FIG. 25, it is possible to equalize the transmittances $T_P$ and $T_S$ for the P and S polarized light components to each other in any even number of film layers by adjusting the conditions of the refractive indices $N_H$ and $N_L$, and also to adjust the transmittances to any values.

Figure 26:
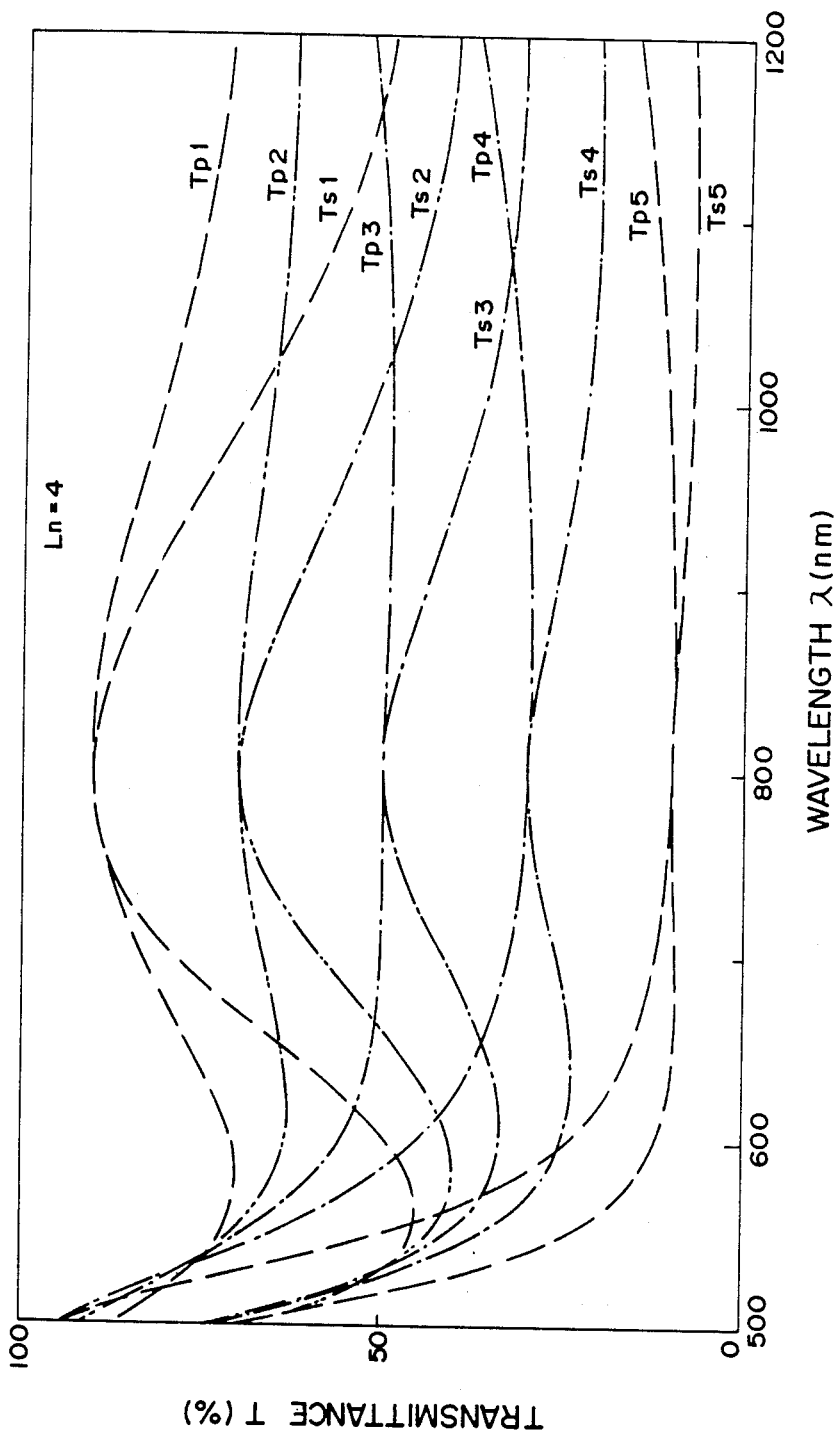
FIG. 26 is a graph showing the spectral transmission characteristics of an embodiment of the beam splitter in accordance with the present invention which is of the plate type and comprises four film layers and which can be employed when the refractive index of the transparent substrate is high.

In the embodiments described above with reference to FIGS. 24 and 25, the incidence said refractive index is 1.0, and the transmission side refractive index is determined to be 1.52. However, the present invention is not limited to these conditions. For example, when the laser generator used in the photo-disk reproducing optical system is a near infrared laser generator, the substrate may be made of silicon, germanium, or the like. FIG. 26 shows the spectral transmission characteristics of some beam splitters comprising four film layers and exhibiting the transmittances $T_P$ and $T_S$ for the P and S polarized light components which are equal to each other in the vicinity of a wavelength of 800 nm when the incidence side refractive index is 1.0 and the transmission side refractive index is 4.0. The angle of incidence is 45° in every case, and the refractive indices $N_H$ and $N_L$ of the respective film layers are shown in Table 13.

TABLE 13

| | (FIG. 26, four film layers) | | | | |
|---|---|---|---|---|---|
| $T_P$ $T_S$ | $T_{P1}$ $T_{S1}$ | $T_{P2}$ $T_{S2}$ | $T_{P3}$ $T_{S3}$ | $T_{P4}$ $T_{S4}$ | $T_{P5}$ $T_{S5}$ |
| $N_H$ | 2.510 | 3.049 | 3.620 | 4.382 | 6.155 |
| $N_L$ | 1.512 | 1.587 | 1.647 | 1.690 | 1.750 |

Further, in the present invention, it is also possible to form the plate type beam splitter so that the transmittance $T_P$ for the P polarized light component is lower than the transmittance $T_S$ for the S polarized light component within a predetermined wavelength range according to the refractive index conditions, as shown in FIG. 27. ($T_{P1}<T_{S1}$ in FIG. 27) Further, the ratio $T_P:T_S$ and the ratio $(T_P+T_S):(R_P+R_S)$ can be adjusted as desired. FIG. 27 shows the transmittances $T_P$ and $T_S$ for the P and S polarized light components obtained when the incidence side refractive index $N_O$ is 1.0, the transmission side refractive index $N_S$ is 1.52, the angle of incidence if 45°, the standard design wavelength $\lambda_0$ is 845 nm, the refractive index $N_L$ of the low refractive index film layers is fixed at 1.80, and the refractive index $N_H$ of the high refractive index film layers is changed. The number of film layers is six (the optical film thickness of each film layer is $\lambda_0/4$), and the relationship between the refractive index $N_H$ and the transmittances $T_P$ and $T_S$ is shown in Table 14.

TABLE 14

| | (FIG. 27, six film layers) | | |
|---|---|---|---|
| | $N_H$ | | |
| T | 2.20 | 2.50 | 3.00 |
| $T_P$ $T_S$ | $T_{P1}$ $T_{S1}$ | $T_{P2}$ $T_{S2}$ | $T_{P3}$ $T_{S3}$ |

In the present invention, the unique characteristics as shown in FIG. 27 which could not be obtained with the conventional beam splitter can be obtained easily. Thus, the present invention can provide various optical systems with novel functions.

Also in the embodiments of FIGS. 22 to 27, the optical film thickness of each film layer is substantially $\lambda_0/4$. However, it is also possible to obtain the desired spectral characteristics by changing the film thickness since the optical thickness for determining the phase of each film layer is a function of the refractive index and the film thickness.

In the embodiments described above, various deposition materials may be used to form the respective film layers. For example, Si is suitable as the high refractive index material, and $TiO_2$, $ZnO_2$, $SnO_2$, ZnS, $Ce_2O_3$, $Al_2O_3$, $CeF_3$, $Nd_2O_3$, and $In_2O_3$ are suitable as the low refractive index materials. Particularly, Si is advantageous since the refractive index can be varied within the range of 3 to 5 by controlling the deposition conditions (temperature of substrate, deposition rate, and the like). Normally, a temperature of the substrate used in the deposition process is within the range of about 300° to about 400° C. In order to obtain a desired refractive index, an equivalent layer consisting of a number of sub-layers of lower refractive index may be used for forming each film layer. The equivalent layer is advantageous in that a refractive index within a desired range can be equivalently obtained (theoretically, any refractive index can be obtained).

We claim:

1. A beam splitter consisting essentially of a transparent substrate having a refractive index $N_S$, one or more low refractive index film layers, each low refractive index film layer having a refractive index $N_L$ higher than said refractive index $N_S$, and one or more high refractive index film layers, each high refractive index film layer having a refractive index $N_H$ higher than said refractive index $N_L$, whereby $N_S<N_L<N_H$, said low refractive index film layer and said high refractive index film layer being alternately stacked on said transparent substrate in such a manner that the uppermost film layer of the stack is the low refractive index film layer.

2. A beam splitter as defined in claim 1 wherein also the lowermost film layer of said stack is the low refractive index film layer.

3. A beam splitter as defined in claim 2 wherein said refractive index $N_S$ satisfies the condition of $$1.3<N_S<4,$$

and said refractive indices $N_H$ and $N_L$ satisfy the conditions of $$2.5<N_H<8,$$

and $$1.6<N_L<5.$$

4. A beam splitter as defined in claim 2 or 3 wherein the optical film thickness of each film layer is substantially $\lambda_0/4$, where $\lambda_0$ is the design wavelength.

5. A beam splitter as defined in claim 2 or 3 wherein said transparent substrate is in the prism form, and said uppermost film layer of said stack is adhered to a prism block via an adhesive layer.

6. A beam splitter as defined in claim 1 wherein said transparent substrate is in plate form and positioned in air having a refractive index $N_O$ of 1.0, and said low refractive index film layer and said high refractive index film layer are alternately stacked on said transparent substrate in such a manner that the lowermost film layer and the uppermost film layer of the stack are the low refractive index film layers.

7. A beam splitter as defined in claim 6 wherein said refractive index $N_S$ satisfies the condition of $$1.3<N_S<4,$$

and said refractive indices $N_H$ and $N_L$ satisfy the conditions of $$1.8<N_H<5,$$

and $$1.4<N_L<3.$$

8. A beam splitter as defined in claim 6 or 7 wherein the optical film thickness of each film layer is substantially $\lambda/4$, where $\lambda_0$ is the design wavelength.

9. A beam splitter as defined in claim 1 wherein said transparent substrate is in plate form and positioned in air having a refractive index $N_O$ of 1.0, and said low refractive index film layer and said high refractive index film layer are alternately stacked on said transparent substrate in such a manner that the lowermost film layer of the stack is the high refractive index film layer and the uppermost film layer of the stack is the low refractive index film layer.

10. A beam splitter as defined in claim 9 wherein said refractive index $N_S$ satisfies the condition of $$1.3 < N_S < 4,$$

and said refractive indices $N_H$ and $N_L$ satisfy the conditons of $$1.8 < N_H < 6,$$

and $$1.4 < N_L < 3.$$

11. A beam splitter as defined in claim 9 or 10 wherein the optical film thickness of each film layer is substantially $\lambda_0/4$, where $\lambda_0$ is the design wavelength.

12. A beam splitter for splitting a light beam that consists principally of a single wavelength consisting essentially of a transparent substrate having a refractive index $N_S$ and a plurality of film layers one atop the next each having a refractive index higher than the refractive index $N_S$, including at least one low refractive index film layer having a refractive index $N_L$ higher than said refractive index $N_S$, and at least one high refractive index film layer having a refractive index $N_H$ higher than said refractive index $N_L$, said low refractive index film layer and said high refractive index film layer being stacked on said substrate such that the uppermost film layer of the stack is the low refractive index film layer.

13. A beam splitter as defined in claim 12, wherein the optical film thickness of each film layer is substantially $\lambda_0/4$, where $\lambda_0$ is the design wavelength.

* * * * *